US011175869B2

(12) United States Patent
Liang et al.

(10) Patent No.: US 11,175,869 B2
(45) Date of Patent: Nov. 16, 2021

(54) POLICY-BASED PRINTING SYSTEM AND METHODS USING A MOBILE DEVICE

(71) Applicant: KYOCERA DOCUMENT SOLUTIONS, INC., Osaka (JP)

(72) Inventors: Jin Liang, Dublin, CA (US); Tai Yu Chen, Dublin, CA (US); Michael Ong Martin, Pacheco, CA (US)

(73) Assignee: KYOCERA DOCUMENT SOLUTIONS, INC., Osaka (JP)

( * ) Notice: Subject to any disclaimer, the term of this patent is extended or adjusted under 35 U.S.C. 154(b) by 0 days.

(21) Appl. No.: 16/831,672

(22) Filed: Mar. 26, 2020

(65) Prior Publication Data

US 2020/0409630 A1 Dec. 31, 2020

Related U.S. Application Data

(63) Continuation-in-part of application No. 16/452,041, filed on Jun. 25, 2019, now Pat. No. 10,929,548, and a continuation-in-part of application No. 16/452,038, filed on Jun. 25, 2019, now Pat. No. 10,942,688, and a continuation-in-part of application No. 16/451,913, filed on Jun. 25, 2019, now Pat. No. 10,817,230.

(51) Int. Cl.
| | |
|---|---|
| *G06F 3/12* | (2006.01) |
| *H04W 12/06* | (2021.01) |
| *H04L 29/06* | (2006.01) |
| *H04W 12/30* | (2021.01) |

(52) U.S. Cl.
CPC .......... *G06F 3/1238* (2013.01); *G06F 3/1222* (2013.01); *G06F 3/1292* (2013.01); *H04L 63/0884* (2013.01); *H04W 12/06* (2013.01); *H04W 12/35* (2021.01)

(58) Field of Classification Search
None
See application file for complete search history.

(56) References Cited

U.S. PATENT DOCUMENTS

| | | | |
|---|---|---|---|
| 6,801,962 B2 | 10/2004 | Taniguchi et al. | |
| 7,624,916 B2 | 12/2009 | Sato et al. | |
| 7,861,282 B2 | 12/2010 | Kakigi | |
| 9,229,666 B2 | 1/2016 | Oguma et al. | |
| 9,461,820 B1 | 10/2016 | Dall | |
| 2007/0107048 A1* | 5/2007 | Halls | H04L 63/0815 726/4 |
| 2007/0156659 A1* | 7/2007 | Lim | H04L 41/0893 |

* cited by examiner

*Primary Examiner* — Andrew H Lam
(74) *Attorney, Agent, or Firm* — Millen, White, Zelano & Branigan, P.C.; William Nixon

(57) ABSTRACT

A policy-based printing system is implemented to allow access to a private domain to print using a public domain. The private domain includes private servers that store documents. The public domain includes servers and a printing device. A public policy server uses a domain list and a protocol connection with a private authentication server to validate a user and identify which private domain to access. The public policy server receives requests from the printing device to process a print job of a document in the private domain. A mobile device is used to coordinate the retrieval and printing of the document using an application. A kiosk may be used to send the document to the printing device from the mobile device.

8 Claims, 14 Drawing Sheets

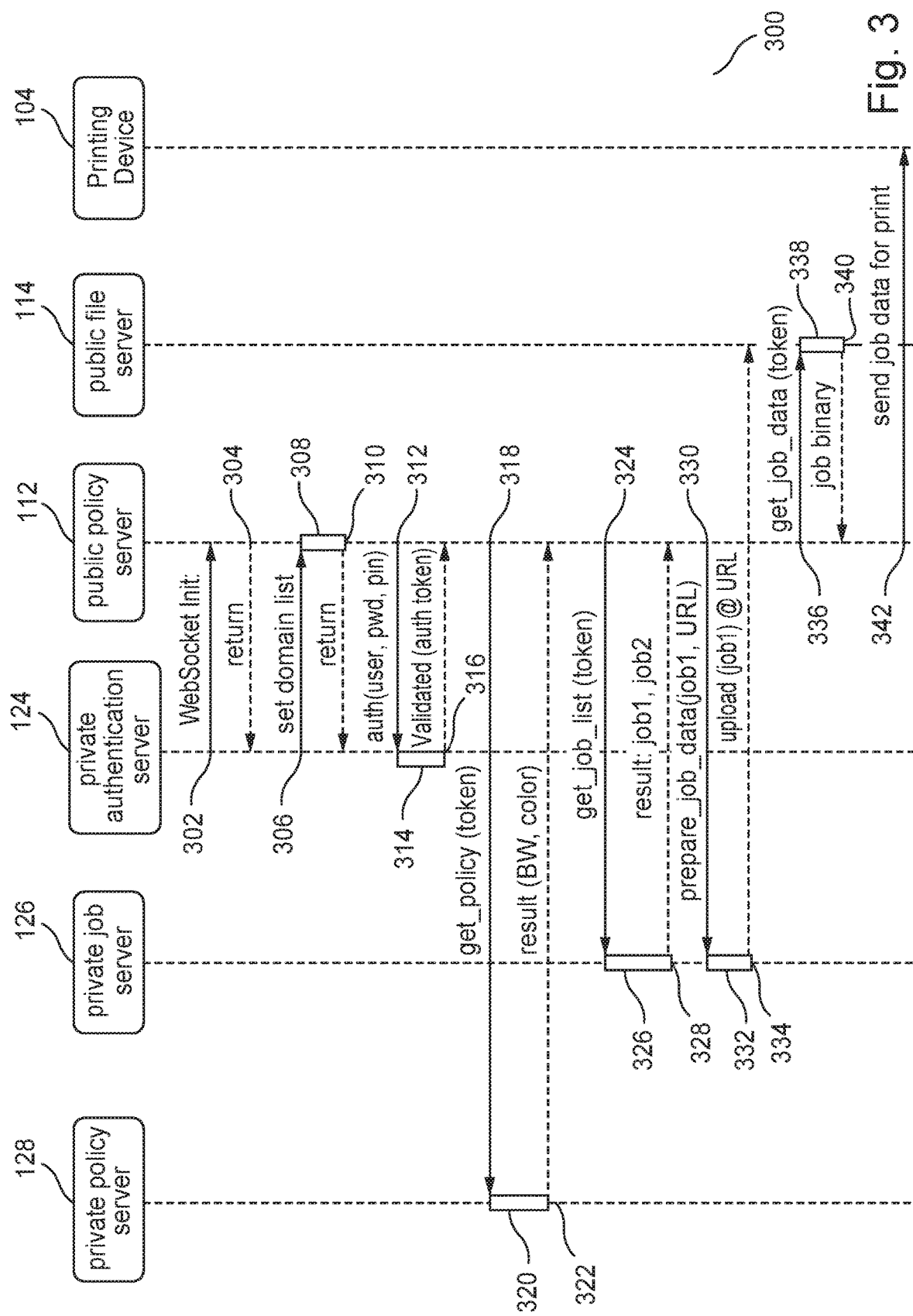

POLICY-BASED PRINTING SYSTEM AND METHODS USING A MOBILE DEVICE

FIELD OF THE INVENTION

The present invention relates to a system of private and public servers that implement policy-based printing operations. The system includes a public and private network that supports the policy used for printing operations, wherein the policy is implemented using a private server in the private network interacting with a mobile device via a public server.

DESCRIPTION OF THE RELATED ART

Existing policy-based printing systems mostly operate within a closed private domain environment. Print data submitted by users may be only accessible within a single domain environment. Some users, such as on-the-go users including insurance and real estate agents, sales executives, lawyers, and company executives, require the capability to access printing data beyond an office environment. These users travel extensively and find themselves needing to print in public locations, such as convenience stores, libraries, airports, copy and printing service stores, and the like. At these locations, the users may not reliably access the printing data. Further, these public locations may not support policy-based printing.

SUMMARY OF THE INVENTION

A policy-based printing method is disclosed. The policy-based printing method includes authenticating a user of a mobile application to send a request to a private server using a public server. The policy-based method also includes selecting a document stored on the private server using the mobile application. The policy-based method also includes sending the request to print the document from the mobile application. The policy-based method also includes applying a policy by the private server to determine whether the request is acceptable. The policy corresponds to the user and is stored at the private server. The policy-based method also includes retrieving the document from the private server to the public server if the request is acceptable. The policy-based method also includes downloading the document at the mobile device from the public server. The mobile application executes on the mobile device. The policy-based method also includes forwarding the document to a printing device from the mobile device. The policy-based method also includes printing the document at the printing device.

A policy-based method using a mobile device is disclosed. The policy-based method includes sending authentication information from a mobile application on the mobile device to a public server. The policy-based method also includes selecting a document stored on a private server using the mobile application. The policy-based method also includes sending a request for the document to the private server through the public server. The policy-based method also includes receiving a notification from the private server that the request is approved. The policy-based method also includes sending an instruction to the public server to retrieve the document. The policy-based method also includes downloading the document to the mobile device from the public server. The policy-based method also includes forwarding the document to a printing device. The printing device prints the document.

A mobile device for use in a policy-based printing system is disclosed. The mobile device is configured to send authentication information from a mobile application on the mobile device to a public server. The mobile device also is configured to send a request for the document to the public server. The mobile device also is configured to receive a notification from the private server that the request is approved. The mobile device also is configured to send an instruction to the public server to retrieve the document. The mobile device also is configured to download the document to the mobile device from the public server. The mobile device also is configured to forward the document to a printing device. The printing device prints the document.

BRIEF DESCRIPTION OF THE DRAWINGS

Various other features and attendant advantages of the present invention will be more fully appreciated when considered in conjunction with the accompanying drawings.

FIG. 3 illustrates a flow diagram for implementing a policy-based printing system according to the disclosed embodiments.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments use an authentication server, a policy server, a file server, a network enabled printing device, and a public domain server. At the printing device, a user may provide authentication information, such as a username or password. The authentication information is transmitted from the device to a public domain server that processes the username for domain information. The domain information is matched to a domain on record and a private server is identified that can handle the domain authentication. The public domain server, through a direct connection to the private server, will go through a series of steps to obtain an authentication token, a policy applicable to the user, a job list of the user, and the job binary data for printing a print job on the printing device.

Figure 1:
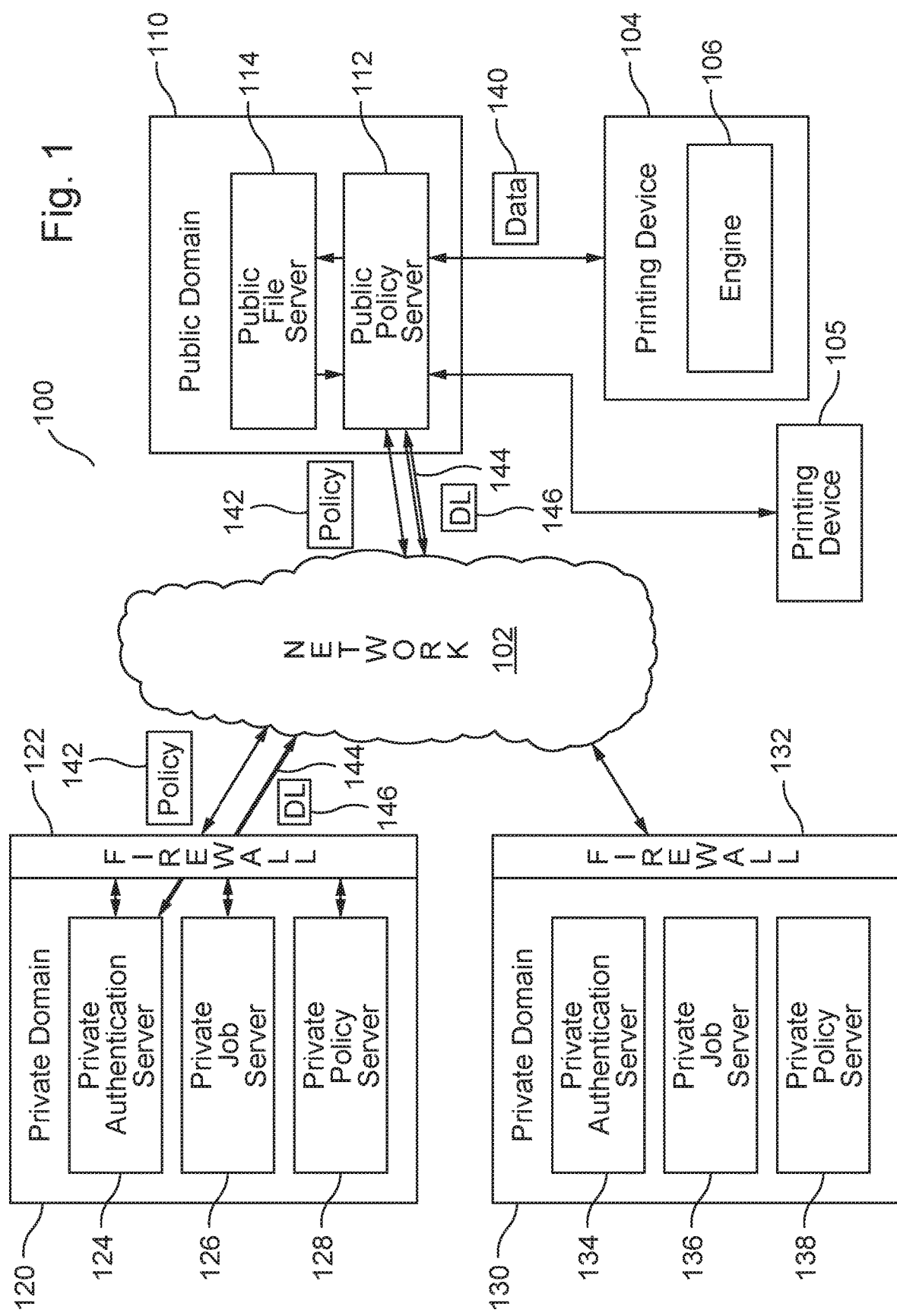
FIG. 1 depicts a system to implement policy-based printing on a printing device according to the disclosed embodiments.

FIG. 1 depicts a system 100 to implement policy-based printing on a printing device 104 according to the disclosed embodiments. System 100 includes network 102 which exchanges data between the public and private domains within system 100. System 100 allows a user to retrieve a print job having job binary data 140 from a private domain server to print on printing device 104. Printing device 104 may be any device that processes the binary data to generate an electronic document that is then printed or accessed by the user. Printing device 104 also may be known as an image forming apparatus or a multi-functional printer. For example, printing device 104 may print on a sheet of paper the document generated from binary data 140. Alternatively, printing device 104 may display the electronic document to the user. Printing device 104 also may store the binary data for the print job. Printing device includes engine 106, which performs many of the operations to print, scan, store, modify, and the like. Printing device 104 and engine 106 are disclosed in greater detail below with reference to FIG. 2.

System 100 include public domain 110 and private domains 120 and 130. Public domain 110 may represent a collection of public servers and devices linked to network 102. In some embodiments, these servers are cloud servers. Public domain 110 also may be known as a public network of the public servers. Public domain 110 is accessible by printing device 104. Additional printing devices may connect to public domain 110, such shown by printing device 105. The printing devices may be located in public places, such as convenience stores, libraries, printing and copying stores and kiosks, and the like. Users may access the printing devices and, in turn, the servers within public domain 110. The users may need to validate their ability to access public domain 110 through a connected printing device.

Public domain 110 includes public policy server 112. Public policy server 112 interacts with private domains 120 and 130 as well as printing devices 104 and 105. Public policy server 112 may act as the middle man between public domain 110 and the private domains. Public policy server 112 may generate and store tokens used to implement the policy-based operations disclosed below. It also may store and allow access to a policy 142 received from a private domain, upon request. Policy 142, disclosed in greater detail below, outlines what a user can and cannot do when printing to printing device 104 from a private domain.

Public file server 114 is connected to public policy server 112. Public file server 114 may store or host binary data 140 for print job from a private domain. Printing device 104 may retrieve binary data 140 securely for a print job. In some embodiments, printing device 104 does so through public policy server 112. Public file server 114 also may receive binary data 140 from a server in a private domain, as disclosed below.

System 100 includes private domains 120 and 140. System 100 may include additional private domains, not shown here. Each private domain may include a plurality of private servers that are protected by a firewall from access from network 102. For example, private domain 120 includes firewall 122. Firewall 122 may be a software or hardware device that filters data and information coming over network 102 to private domain 120 for malicious or unauthorized access. If an incoming packet of data is flagged by the filters in firewall 122, then it is not allowed through to private domain 120. Firewall 132 may serve the same function for private domain 130.

Private domain 120 includes private authentication server 124, private job server 126, and private policy server 128. Private domain 130 includes private authentication server 134, private job server 126, and private policy server 128. The servers for private domain 120 are disclosed below, but their functionality may apply to the servers in private domain 130. Further, additional servers may be in a private domain and used securely to exchange information over network 102.

Private authentication server 124 is a private domain server that will provide authentication and authorize a user to prove his/her identify. Private authentication server 124 may be the main server that connects the private and public domain information exchange. In some embodiments, private authentication server 124 establishes a protocol connection 144 with public policy server 112 to provide a domain list 146 for access to private domain 120. Private authentication server 124 also verifies a user trying to access private domain 120 using public policy server 112.

Private job server 126 is a private domain server that stores all the binary data for the job files, or print jobs. When a user wants to print out a job file at printing device 104, private job server 126 should be queried in order to retrieve binary data 140 to generate the print job. Private job server 126 may forward binary data 140 to public file server 114 according to policy 142.

Private policy server 128 is a private domain server that hosts or stores all the policies, such as policy 142, related to a user. When printing device 104 attempts to perform any function, it should request private policy server 128 determine whether the user is allowed to do so. Private policy 128 may do the determination via public policy server 112.

The disclosed embodiments allow access to private servers from a public domain or to print on printing device 104 within a public network. An intranet application may do the authentication and job spooling so users need to authenticate printing device 104 before use. A policy may be associated with where a user can print, what kind of paper, number of pages, and the like. For example, some users may want to print from a public location, such as a convenience store, and want to access a private server that stores the print jobs. They would need access from network 102.

In some embodiments, public policy server 112 is a cloud server. Public policy server 112 may not be able to do accounting policy management to determine whether a user is allowed to print at printing device 104. Private domains 120 and 130 can operate over the cloud. Public policy server 112 may enforce the rules of the policy but management of the policy is still at a private server. Public policy server 112 also needs to distinguish between the private servers and private domains. Thus, if a user is outside the private network for a private domain, public policy server 112 will find the correct private domain to connect. That private domain will validate the user and access or use of the print job.

Figure 2:
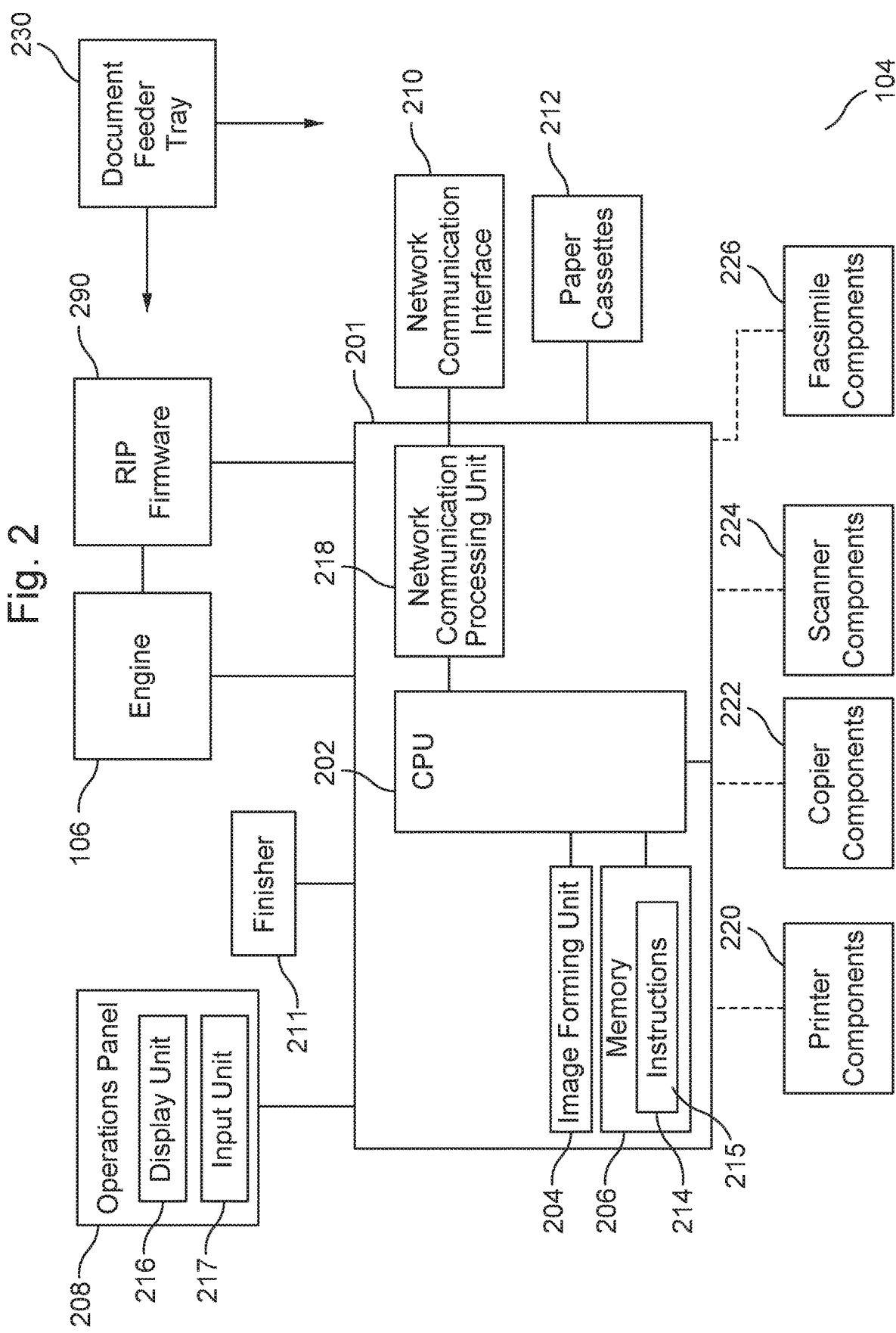
FIG. 2 illustrates a block diagram of components of the printing device used in conjunction with the authentication system according to the disclosed embodiments.

FIG. 2 illustrates a block diagram of components of printing device 104 used in conjunction with system 100 according to the disclosed embodiments. The architecture shown in FIG. 2 may apply to any multi-functional printer or image forming apparatus that scans documents to perform other functions, such as printing, storing, copying, and the like. As disclosed above, printing device 104 may send and receive data from public domain 110 and private domains 120 and 130.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to image the various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine firmware 106 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the authentication operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter an identification code 138 generated by mobile application 110 into printing device 104.

Printing device 104 also includes network communication processing unit 218. Network communication processing unit 218 may establish a network communication, such as a wireless or wired connection with one or more other image forming apparatuses and a server in an image forming system. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 106. Engine 106 may be a combination of hardware, firmware, or software components that act accordingly to accomplish a task. For example, engine 106 is comprised of the components and software to print a document. It may receive instructions from computing platform 201 after user input via operations panel 208. Alternatively, engine 106 may receive instructions from other attached or linked devices.

Engine 106 manages and operates the low-level mechanism of the printing device engine, such as hardware components that actuate placement of toner onto paper. Engine 106 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 106 for actual rendering of an image and application of the toner onto paper during operations on printing device 104.

FIG. 3 depicts a flow diagram 300 for implementing policy-based printing system 100 according to the disclosed embodiments. In disclosing the embodiments shown by flow diagram 300, reference may be made to elements shown in FIGS. 1-2 and 4A, 4B, and 5. Flow diagram 300 shows the operations between the various servers disclosed in FIG. 1 above. Flow diagram 300 also depicts the actions taken at the various servers. The private and public servers may perform additional operations and actions not shown herein. The operations may be executed over network 102. Further, flow diagram 300 shows the operations between public domain 110 and private domain 120. Thus, firewall 122 may exist between the public servers and the private servers. The same operations may be executed between public domain 110 and private domain 130.

The processes disclosed by flow diagram 300 seek to solve the problem of how to authenticate a user in one location, such as a convenience store with printing services, that he/she is within an organization that has a policy applicable to the user. Further, the policy is stored in a private domain not readily accessible from the printing device at the convenience store. The printing device is connected to a public network and may be part of a public domain, such as public domain 110. The disclosed embodiments enable the user and the organization to implement the policy, which is applicable to the private domain, within the public domain of the printing device located in the convenience store.

Operation 302 executes by private authentication server 124 sending an initialization request to public policy server 112. As disclosed above, private authentication server 124 is within private domain 120 and public policy server 112 is within public domain 110. To send the initialization request, an administrator enter information about public policy server 112. Such information may include server network address, location, server capabilities, and the like. Once the information is entered, private authentication server 124 generates a verification token 502 which verifies that public policy server 112 is acceptable to receive information and communicate with the private authentication server.

Operation 304 executes by returning acceptance of the initialization request and establishing a protocol connection 144 between private authentication server 124 and public policy server 112. Protocol connection 144 may stay established as long as public policy server has verification token 502. Verification token 502 may be stored on public policy server 112 and presented whenever verification is required by private authentication server 124. Protocol connection 144 provides a persistent connection between private authentication server 124 and public policy server 112 that allows the servers to send data at any time. Protocol connection 144 preferably may be known as a WebSocket connection, which provides a full-duplex communication channel over a single connection. Preferably, protocol connection 144 uses a secure protocol.

Operation 306 executes by providing a domain list 400 from private authentication server 124 to public policy server 112. This operation also may include providing the information about the private authentication server. Action 308 executes by setting domain list 400 at public policy server 112 to include domain information for private authentication server 124. Public policy server 112 may refer to domain list 400 whenever a user attempts to print from a private domain. Public policy server 112 may use information provided by the user to determine which domain to obtain policy 142. For example, public policy server 112 may be connected to more than one private domain. Domain list 400 determines which private domain applies to a user trying to print.

Figure 4A:
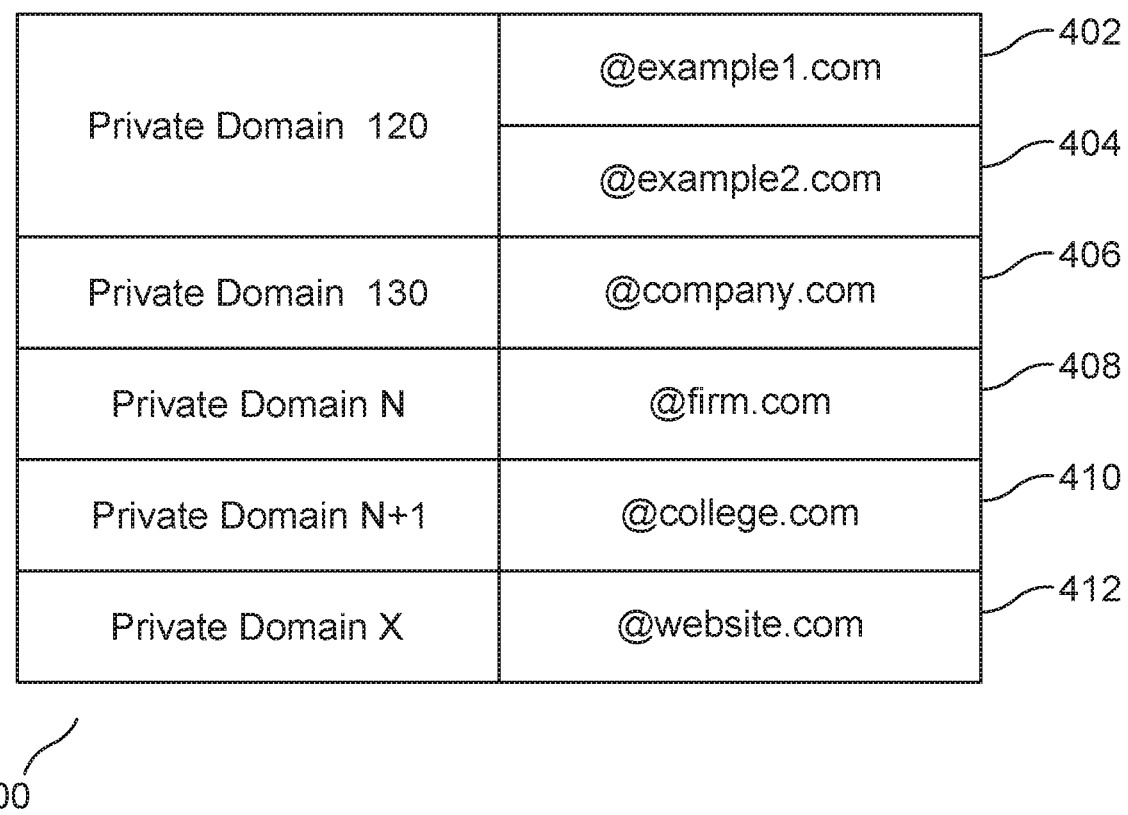
FIG. 4A illustrates a domain list for use within the policy-based printing system according to the disclosed embodiments.

FIG. 4A depicts an example domain list according to the disclosed embodiments. Domain list 400 may be a file having fields for the private domains and the email domains associated with each domain. A user is identified as part of a domain using his/her email address. Public policy server 112 will compare the email provided by the user to determine which private domain to access. As shown in FIG. 4A, private domain 120 may be associated with two email domains 402 and 404. A user having an email domain with "@example1.com" or "@example2.com" will have its policy and associated documents located on private domain 120. A user having an email domain 406 with "@company.com" will have its policy and associated documents located on private domain 130. Additional private domains may be served by public policy server 112. Private domain N will receive requests for policies of users having email domain 408 of "@firm.com" and private domain N+1 will receive requests for policies of users having email domain 410 of "@college.com."

As can be seen, companies, firms, and colleges have an interest in keeping their network domains private. Further, these entities may wish to limit use of printing devices within public domains according to a policy. Domain list 400 also may include an entry for a public domain, such as public domain X. In some instances, a public domain also may include policies to limit capabilities of a user on a printing device 104. These policies, however, may not be within a private domain and available for retrieving through a public network connection. An email domain of "@website.com" may direct public policy server 112 to a public domain for the associated policy 142. Referring back to FIG. 3, operation 310 returns an acknowledgement to private authentication server 124 that domain list 400 has been set and protocol connection 144 exists with public policy server 112.

Operation 312 executes when a user wants to print a document at printing device 104 coupled to public policy server 112. Authentication information 504 is provided from public policy server 112 to private authentication server 124. In some embodiments, the user enters a username and password that is captured by public policy server 112. For example, the user may enter this information at printing device 104 which forwards it to public policy server 112. Alternatively, the user may connect to public policy server 112 through an application on a mobile device or the like to provide authentication information 504.

In other embodiments, the user may enter a code, such as a personal identification number (PIN), that retrieves this information to provide it to public policy server 112. Public policy server 112 receives the code and matches the user information when the code is provided. Other embodiments may use a graphical code or identification card having a number that provides this information. Operation 312 sends this authentication information 504, such as username, password and PIN, to private authentication server 124.

Action 314 executes by authenticating the user with authentication information 504. Thus, user information is not stored on public policy server 112. Authentication still occurs in private domain 120 behind firewall 122. If the user is authenticated, then action 314 also includes private authentication server 124 generating authentication token 506. Operation 316 executes by indicating that the user has been validated and providing authentication token 506 to public policy server 112. Public policy server 112 may assign authentication token 506 to the user. Using the PIN example, the entered PIN may be associated with authentication token 506.

Private authentication server 124 also may provide an email address or the email domain, such as email domains 402-412 shown in FIG. 4A, to public policy server 112 if this information is not already available. For example, it may be too cumbersome to enter email addresses at printing device 104. Further, the administrators of private domain 120 may not want valid email addresses being entered at printing device 104 on a public network or in a public place. Thus, no email address is provided to public policy server 112 from within public domain 110 but, instead, from private domain 120. Moreover, private authentication server 124 may provide only the domain and not the actual email address.

Once validated, public policy server 112 now retrieves a policy 142 from private policy server 128. Operation 318 executes by getting policy 142. The email domain is compared against domain list 400 to determine which private domain to query for the policy. In this example, user@example1.com is the email provided to public policy server 112. It compares the email to domain list 400 to determine the applicable policy is within private domain 120. Public policy server 112 sends determined domain 508, such as example1.com, along with authentication token 506 to private policy server 128 in operation 318. If the next user has an email domain of @company.com, then public policy server 112 determines that domain 508 is company.com and that the applicable policy is located in private domain 130.

Figure 4B:
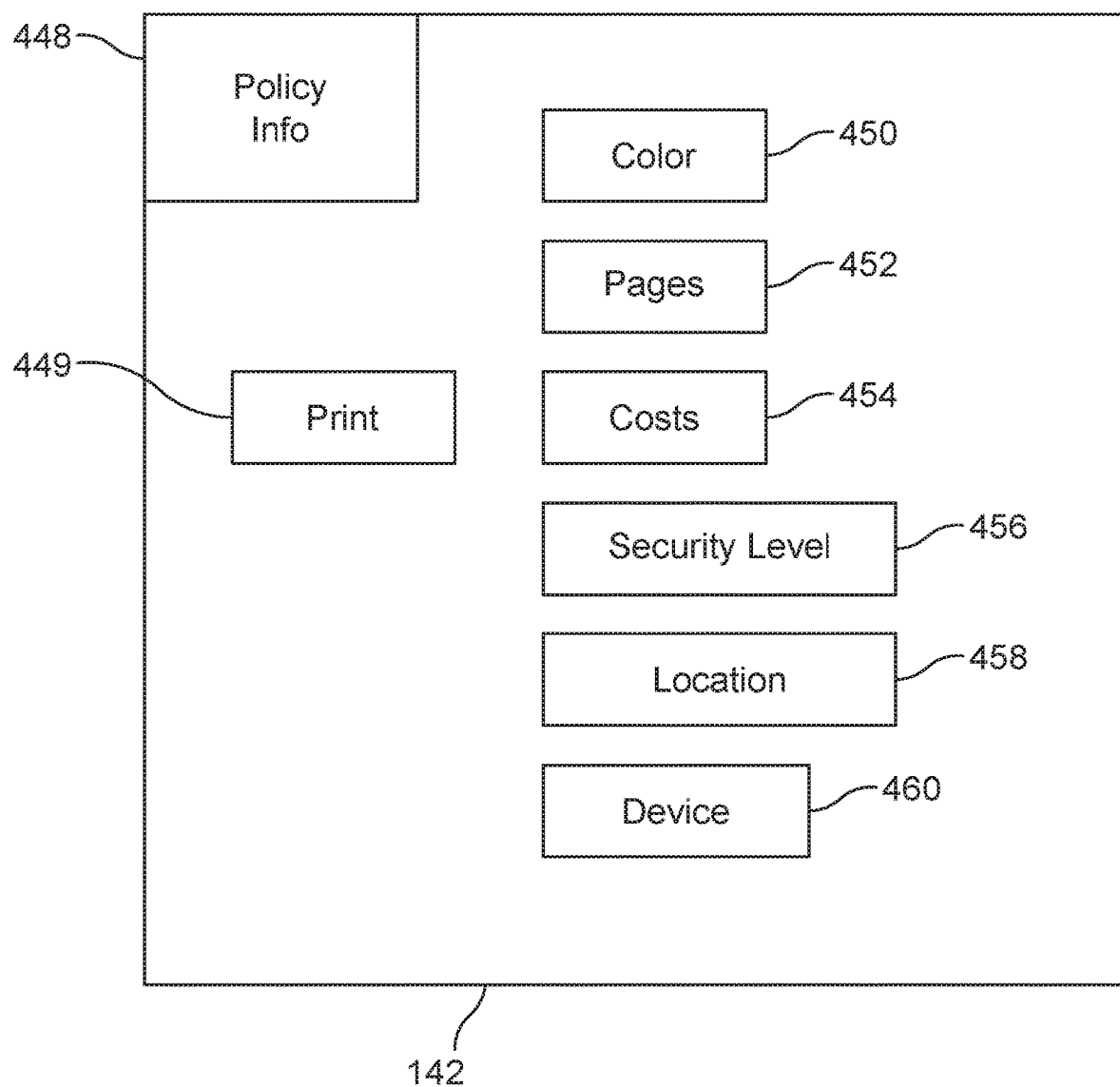
FIG. 4B illustrates a policy for use within the policy-based printing system according to the disclosed embodiments.
Figure 5:
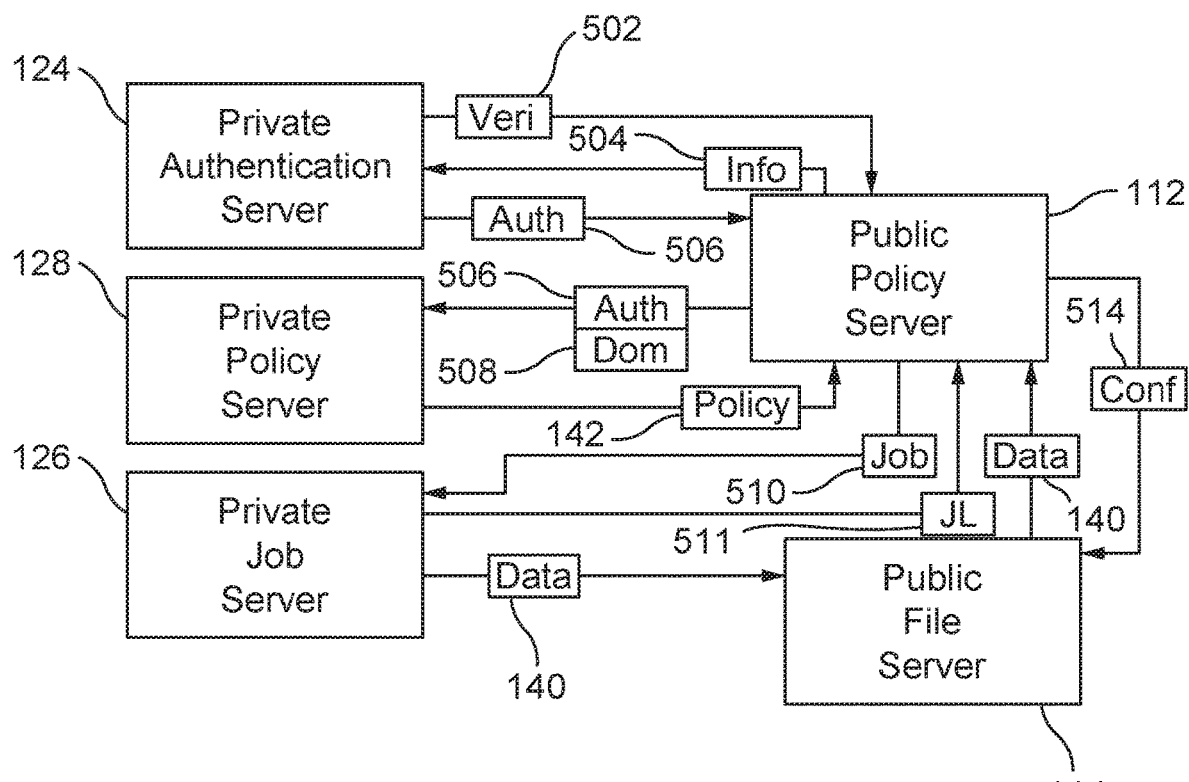
FIG. 5 illustrates a block diagram of servers and data used within the policy-based printing system according to the disclosed embodiments.

Action 320 executes by identifying policy 142 as being applicable to the user based on domain 508. Authentication token 506 may be associated with the user and this information provided from private authentication server 124. Policy 142 may be a file having flags or other information to indicate what the user can do within a public network. For example, limitations may be set as to what type of printing can be done, the number of pages may be printed, and the like. FIG. 4B depicts a block diagram of an example policy for policy 142 according to the disclosed embodiments.

Policy 142 may include policy information 448. Policy information 448 may include a title of the policy, document information, and private domain information. Policy 142 includes data, such as flags, that indicates what can and cannot be performed in public domain 110. This data may be known as parameters in policy 142. Examples of parameters that limit printing operations are shown in FIG. 4B. Print parameter 449 may be set to indicate whether a user can even print outside private domain 120. Certain users may not be allowed to print in a public domain. Print parameter 449 may be set to limit these users to scanning documents only or other operations that do not allow access to any documents or information stored in private domain 120.

Color parameter 450 may indicate whether the user can do color printing in public domain 110. If no, then the user may be limited to only black and write printing. The user may be allowed to do color printing at printing devices in private domain 120 but not allowed to do so in a public domain setting.

Pages parameter 452 may set a limit on the number of pages that a user can print. The administrators of private domain 120 do not want unlimited printing to occur outside the private domain. Pages parameter 452 may limit the number of pages printed per day, week, month, hour, year, and the like. Alternatively, pages parameter 452 may cap the number of pages printed to have the user check with the administrators of public domain 120 to reset this parameter. Once the user hits a limit, he/she requests that the number of pages printed be reset to allow further operations. Costs parameter 454 may be similar to pages parameter 452 except to limit the amount of fees that the user may incur before printing is stopped. Costs parameter 454 helps prevent the user from running up large bills at a convenience store. It also may cap the amount of costs incurred on a periodic basis or as a total cost.

Security level parameter 456 may indicate that the user can only access documents from a job list provided from private job server 126 having a certain security or access level. Security level parameter 456 may help prevent accidental or intentional printing of sensitive documents at printing device 104. Further, the user may have access to sensitive documents when printing within private domain 120 but not so when printing using public domain 110. Policy 142 may limit exposure to such documents.

Location parameter 458 may indicate whether the user can print at certain locations. Policy 142 may place geographic or other limitations on where the user can print using a public domain. Location parameter 458 also may indicate the type of locations to allow printing operations. For example, the administrators of private domain 120 may not allow printing in a convenience store but may allow printing in a library. Device parameter 460 may act similar to location parameter 458 except limit printing on certain devices. For example, policy 142 may not allow printing on a printing device 104 that does not have legal sized paper capability or stores the data from the job file in a memory on the device. Device parameter 460 also may limit printing operations to known printing devices having a serial number or IP address.

Operation 322 executes by providing policy 142 to public policy server 112. Public policy server 112 may configure policy 142 to determine whether the user can print using public domain 110 and what limits on the printing operations may be enforced. Policy 142 may apply to all users of private domain 120. Alternatively, policy 142 may treat users differently. Some users may have unlimited printing privileges according to parameters 452 or 454 while others are prevented from exceeding a cap set forth by these parameters. Public policy server 112 configures the determinations using policy 142 accordingly.

Using the parameters within policy 142, operation 324 executes by getting a job list from private job server 126. Public policy server 112 may generate a job token 510. Job token 510 is presented to private job server 126 to obtain a job list 511 of print jobs available to the user. In some embodiments, job token 510 may include data that specifies what print jobs can be added to job list 511 based on the parameters set forth in policy 146. Job list 511 includes those print jobs that meet the specifications of policy 146. For example, color print jobs will not be included in job list 511 of policy 146 does not allow color printing for the user in a public domain. Action 326 executes by generating job list 511 in response to job token 510. Operation 322 executes by sending the print jobs in job list 511 to public policy server 112 from private job server 126.

The user then may select a print job from job list 511. The user may select from an interface provided on printing device 104 that is then communicated to public policy server 112. Alternatively, an application may execute on a device of the user that presents the job list and allows for selection from the list. The selection is sent to public policy server 112. Operation 330 executes by sending a command to private job server 126 to prepare a selected print job along with a uniform resource locator (URL) address from public policy server 112. The URL address is one associate with public policy server 112 and accessible from public domain 110.

Action 332 executes by retrieving and preparing the data for the print job. Preferably, the data is binary data that represents the document for the print job. This may be shown as binary data 140 in FIGS. 1 and 5. Action 332 also may convert the data into a format compatible with printing device 104. For example, the document may include data that calls for printing on a legal sized paper while printing device 104 only prints using letter sized paper. The data sent from private job server 126 may be modified to fit onto a letter sized paper.

Operation 334 executes by uploading binary data 140 to the URL address provided in operation 330. Thus, private job server 126 puts the data for the print job outside private domain 120 for the first time at this point. The URL address may be valid for only a specified period of time, such as two hours, one day, a week, and the like. After that point, the URL address may expire. The URL address to download binary data 140 for the print job is provided to public file server 114.

Public policy server 112 now retrieves binary data 140 and sends the data to printing device 104. Before that occurs, however, the disclosed embodiments may confirm whether the user has enough funds to pay for processing and completing the print job. Operation 336 executes by generating a confirmation token 514 at public policy server 112 once it is confirmed that the user or user's account has enough money to cover expenses to print. Public policy server 112 may compare the funds available to the cost to complete the print job. If there are enough funds, then confirmation token 514 is generated and sent to public file server 114. If not, then the user may be alerted to add more funds to his/her account.

Action 338 executes by obtaining uploaded binary data 140 from the URL address. Public file server 114 may send a call to the URL address which then sends binary data 140 to the public file server. Public file server 114 may store binary data 140 until confirmation token 514 is received. If a confirmation token 514 is not received within a specified time frame, then binary data 140 may be deleted from public file server 114. This feature prevents print jobs from private domain 120 from being stored indefinitely in public domain 110. Other factors may be used to determine when to delete any stored files of binary data.

Operation 340 executes by sending binary data 140 for the print job from public file server 114 to public policy server 112. Operation 342 executes by sending binary data 140 from public policy server 112 to printing device 104. Printing device 104 may process the print job accordingly. The user's account for printing on public domain 110 may be charged accordingly as well. In some embodiments, public file server 114 may send binary data 140 to printing device 104.

The disclosed embodiments allow a private domain, or network, to print to a public domain using a policy applicable to the public domain. Internal policies to the private domain are not material to printing in the public domain. Further, job data is kept private as long as possible. The data for the print job is provided to the public domain when requested by the user and approved according to the policy. This feature allows the user to print anywhere. The print job is not automatically sent outside the private domain or from the private servers until printing actually occurs. The disclosed embodiments provide greater flexibility for companies and users to access documents in a secure, private location and use devices and resources in a public setting.

Figure 6:
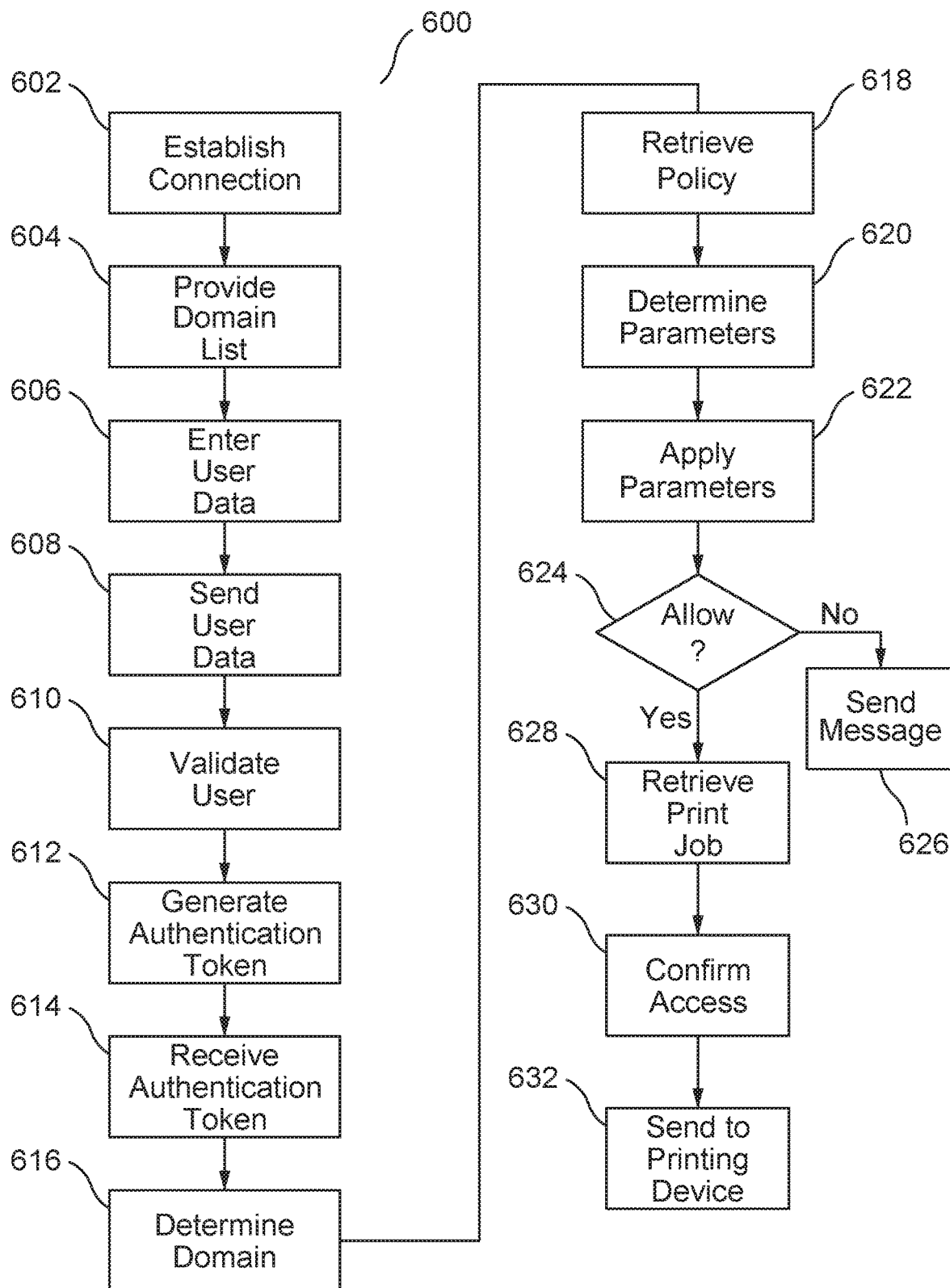
FIG. 6 illustrates a flowchart for printing at a printing device within the policy-based printing system according to the disclosed embodiments.

FIG. 6 illustrates a flowchart 600 for printing at printing device 104 within policy-based printing system 100 according to the disclosed embodiments. Flowchart 600 may refer back to elements disclosed in FIGS. 1-5 for illustrative purposes. The embodiments disclosed by flowchart 600, however, are not limited to the features disclosed in FIGS. 1-5. Further, flowchart 600 may compliment the embodiments disclosed by flow diagram 300.

Step 602 executes by establishing a protocol connection 144 between private authentication server 124 and public policy server 112. The protocol connection allows communication between the servers, one in private domain 120 and another one in public domain 110. Step 604 executes by providing a domain list 146 from private authentication server 124 to public policy server 112. Domain list 146 may include applicable private domains and associated email domains that are accessible by public policy server 112. Step 606 executes by entering user data 504 within public network 110 and providing the data to public policy server 112. Step 608 executes by sending user data 504 to private authentication server 124.

Step 610 executes by validating the user at private authentication server 124. Private authentication server 124 checks the provided user data 504 against its stored authentication records for the user. If the user is validated, then step 612 executes by generating authentication token 506. Step 614 executes by receiving authentication token 506 at public policy server 112. Step 616 executes by determining the applicable private domain for the user according to domain list 146. Preferably, public policy server 112 uses the email address for the user to determine which private domain to access for the policy for the user.

Step 618 executes by retrieving policy 142 from private policy server 128 based on the receipt of authentication token 506 and domain 508 from public policy server 112. Private policy server 128 is identified according to the applicable domain 508 and queried by public policy server 112. Once verified, private policy server 128 sends policy 142 to public policy server 112.

Step 620 executes by determining the parameters for policy 142. This process is disclosed above. As shown in FIG. 4B, policy 142 may include parameters that outline what printing options are available to the user. Step 622 executes by applying the parameters to configure public policy server 112 to determine what print jobs or operations are available to the user in public domain 110.

Step 624 executes by determining whether the user is allowed to access printing device 104 using public domain 110 according to the policy. Further, step 624 determines what print jobs are available to the user according to policy 142. The determination also may include reviewing policy 142 for allowing other operations on printing device 104 such as scanning, editing, faxing, and the like. If no, then step 626 executes by sending a message to the user or public policy server 112 that the operation on printing device 104 is not allowed.

If step 624 is yes, then step 628 executes by retrieving the print job from private job server 126. A job list 511 may be provided. The print job is selected from job list 511. Job token 510 is generated by public policy server 112. Public policy server 112 sends job token 510 to private job server 126 to obtain job list 511. Upon selection of the print job, private job server 126 uploads binary data 140 for the print job to a location accessible by public file server 114. Step 630 executes by confirming access to binary data 140 for the print job by checking to see if the user has enough money to pay for using printing device 104. Other restrictions also may be checked, such as time of day, location, and the like, to confirm whether the print job should be released to printing device 104.

Step 632 executes by sending binary data 140 to printing device 104 upon confirmation in step 630. Public policy server 112 generates a confirmation token 514 to confirm that the user is allowed to print. Public policy server 112 may send confirmation token 514 to public file server 114. Upon receipt of the confirmation token, public file server 114 may forward binary data 140 for the print job to public policy server 112, which provides the data file to printing device 104.

Figure 7:
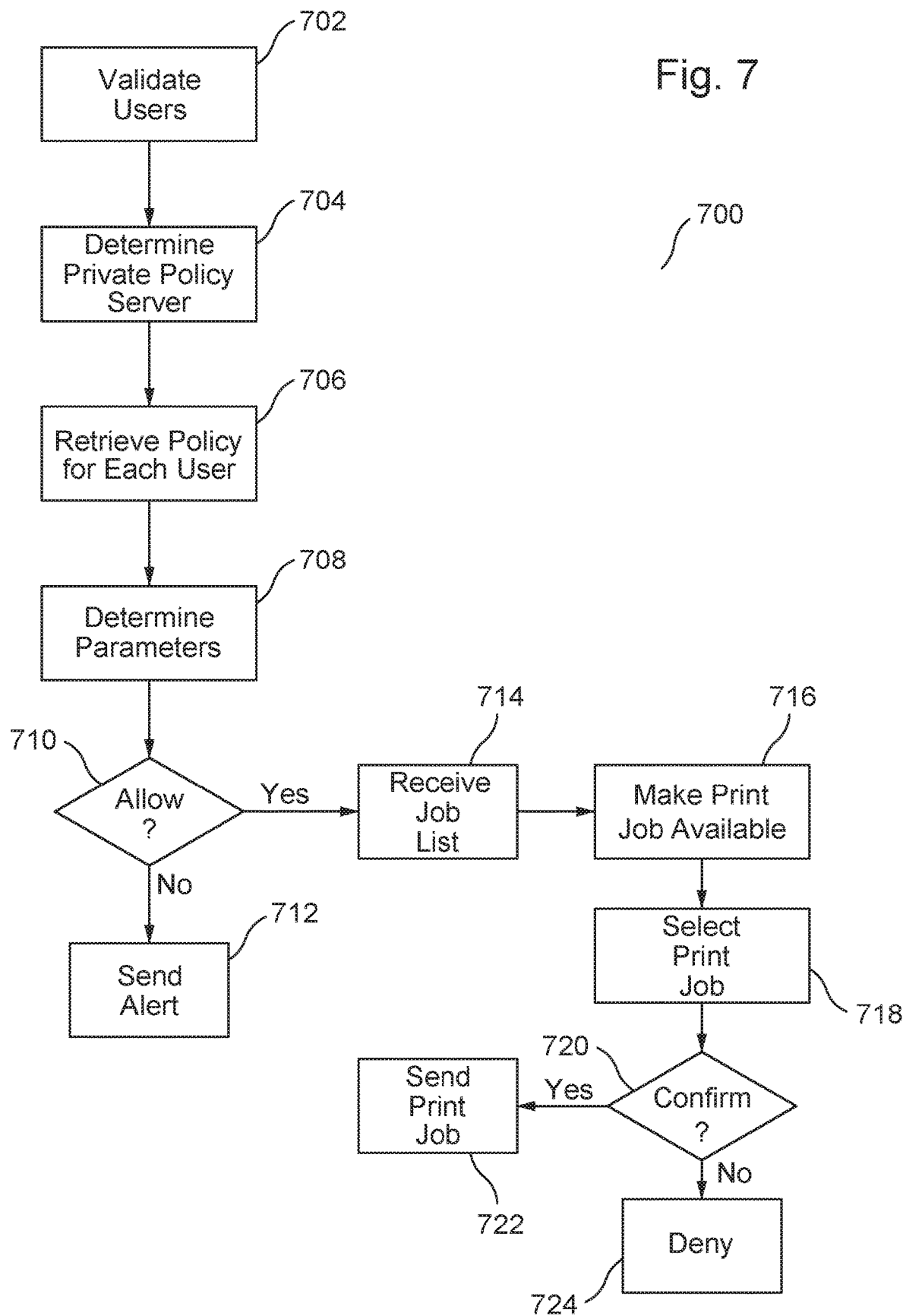
FIG. 7 illustrates a flowchart for implementing a policy-based printing system in a public domain according to the disclosed embodiments.

FIG. 7 illustrates a flowchart 700 for implementing a policy-based printing system 100 in a public domain 110 according to the disclosed embodiments. Flowchart 700 may refer back to elements disclosed in FIGS. 1-5 for illustrative purposes. The embodiments disclosed by flowchart 700, however, are not limited to the features disclosed in FIGS. 1-5. Further, flowchart 700 may compliment the embodiments disclosed by flow diagram 300.

As disclosed above, public policy server 112 may interact with a plurality of private domains. Public policy server 112 may retrieve and implement more than one policy for printing or processing print jobs in public domain 110. In some embodiments, public policy server 112 may implement policies for a plurality of public domains as well. Further, a plurality of printing devices may be connected to public policy server 112. Flowchart 700 discloses some embodiments that have public policy server 112 interacting with more than one private domain.

Step 702 executes by validating users within public domain 110 at private authentication server 124. As disclosed above, a protocol connection may be established between public policy server 112 and private authentication server 124 to exchange user information to perform the validation.

Step 704 executes by determining a private policy server for each user according to a domain for the user at public policy server 112. The domains for each user are private domains. Preferably, the email domain for each user indicates the applicable private domain for that user. With two or more users, different email domains may indicate more than one private domain. Step 706 executes by retrieving a policy 142 for each user according to the respective domain from private policy server 128.

Step 708 executes by determining the parameters for each policy 142. All of the policies are received at public policy server 112. Public policy server 112 configures the treatment of printing requests for each private domain according to the corresponding policy. The policy sets forth the parameters for printing from the private domain via the public domain.

For example, the parameters for one policy may only allow 100 pages to be printed per user a month from private domain 120 while the parameters for another policy may only allow 20 pages to be printed per user from private domain 130. Public policy server 112 is configured accordingly.

Step 710 executes by determining whether the user is allowed to print according to the applicable policy. If no, then step 712 executes by sending an alert to public policy server 112 or to the user. No printing operations using public domain 110 are allowed. If yes, then step 714 executes by receiving a job list according to the applicable policy from private job server 126. Step 716 executes by making the print jobs in the job list available to the user. Step 718 executes by selecting a print job from the job list. Binary data 140 for the selected print job is retrieved from private job server 126 and made available to public file server 114.

Step 720 executes by confirming whether the print job may be sent to printing device 104. Public policy server 112 confirms that the user has enough funds or credits to perform the request task on printing device 104. If yes, then step 722 executes by sending the print job as binary data 140 to printing device 104. If no, then step 724 executes by denying the print job. The user may be prompted to provide additional funds or credits to perform the requested task.

Figure 8:
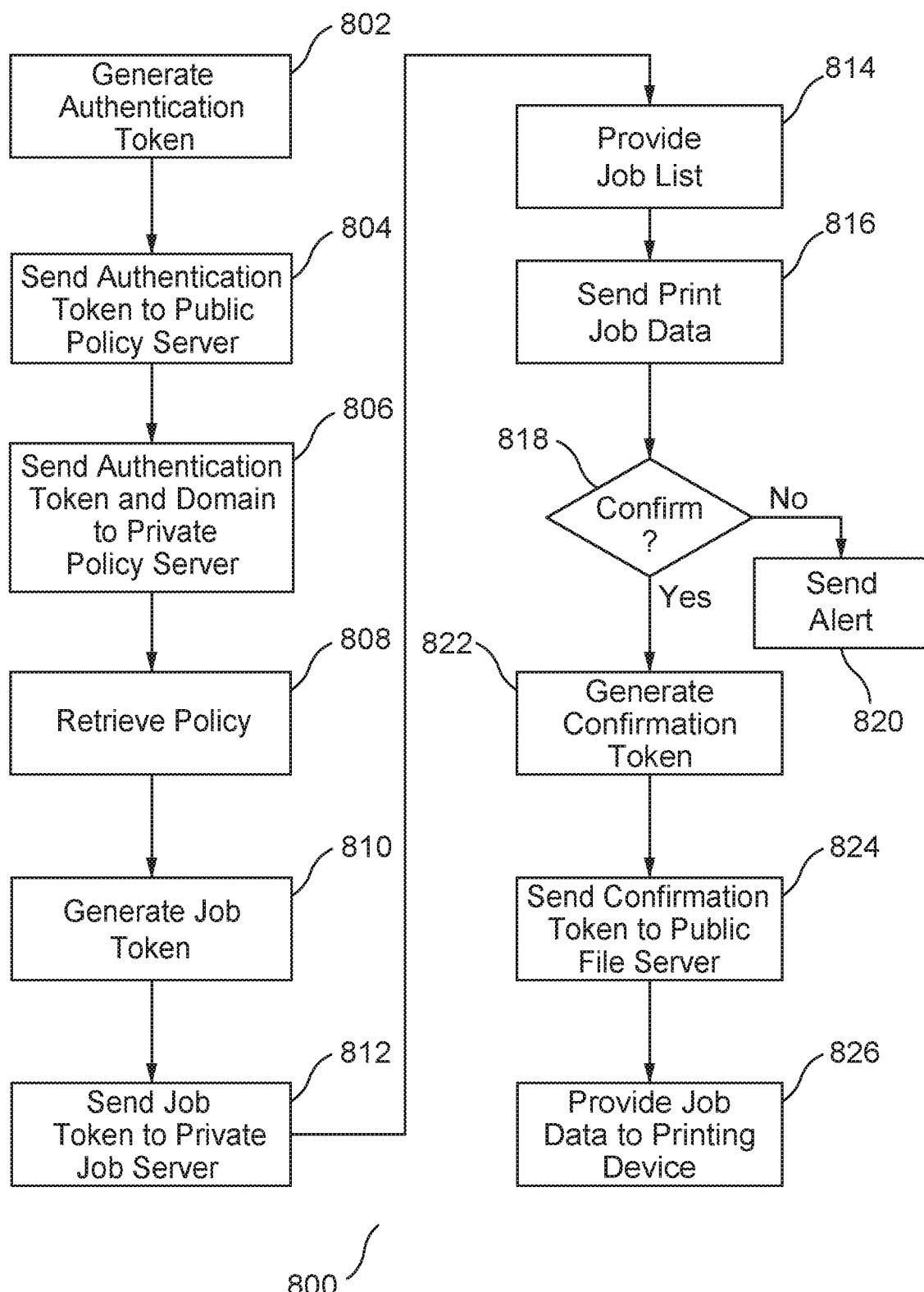
FIG. 8 illustrates a flowchart for implementing a policy-based printing system using tokens according to the disclosed embodiments.

FIG. 8 depicts a flowchart 800 for implementing a policy-based printing system 100 using tokens according to the disclosed embodiments. Flowchart 800 may refer back to elements disclosed in FIGS. 1-5 for illustrative purposes. The embodiments disclosed by flowchart 800, however, are not limited to the features disclosed in FIGS. 1-5. Further, flowchart 800 may compliment the embodiments disclosed by flow diagram 300.

Step 802 executes by generating authentication token 506 at private authentication server 124. This step occurs once private authentication server 124 validates a user attempting to print using public domain 110. Public policy server 112 sends user information 504 including an email address, username, password, or PIN to private authentication server 124. Private authentication server 124, being in private domain 120, may securely store this information for the user. The secure user information is not made available in public domain 110. Authentication token 506 indicates that the user may access private domain 120. Step 804 executes by sending authentication token 506 to public policy server 112.

Step 806 executes by sending authentication token 506 and domain 508 to private policy server 128. Public policy server 112 sends authentication token 506 and domain 508 after the domain is determined using domain list 146. An email address may indicate an email domain that is used as domain 508. Domain 508 indicates which private domain to access for the applicable policy. For example, referring to FIG. 4A, an email of user@example1.com will indicate private domain 120. Public policy server 112 attaches authentication token 506 to domain 508 and sends the request for the policy for the user.

Step 808 executes by retrieving policy 142 from private policy server 128. Authentication token 506 confirms that the user corresponds to the policy. Authentication token 506 may include data provided by private authentication server 124 that identifies the user as able to use private domain 120 and, therefore, policy 142 for the private domain should be used in printing on public domain 110. Private policy server 128 sends policy 142 to public policy server 112. Public policy server 112 then configures itself to apply the parameters of the policy to using public domain for the user.

Step 810 executes by generating job token 510 at public policy server 112 after applying the parameters of policy 142. The parameters may detail what the user can do using public domain 110. These parameters may not necessarily correspond to what the user can do using private domain 120. Limitations are placed on the user on how he/she can use printing device 104. Job token 510 may reflect the parameters to compile the job list of print jobs available to the user according to policy 142.

Step 812 executes by sending job token 510 to private job server 126. Private job server 126 may store the print jobs available to the user or to users in private domain 120. In some embodiments, a plurality of print jobs may be available such that a job list 511 is generated based on the parameters for the user in using public domain 110. Job token 510 may be used in generating job list 511 in that it includes information to select the appropriate print jobs to include in the print job list.

Step 814 executes by providing print job list 511 to public policy server 112. The user may select a print job from print job list 511. Alternatively, the desired print job may already be selected such that public policy server 112 receives data for the selection, such as from an application on a mobile device, that corresponds to the print job in job list 511. Public policy server 112 then requests the print job data from private job server 126. Step 816 executes by sending job binary data 140 for the selected print job from private job server 126 to public file server 114.

Step 818 executes by confirming whether the user may print or process the print job at printing device 104. For example, public policy server 112 may confirm that the user has enough funds in an account to pay for printing on printing device 104. If step 818 is no, then step 820 executes by sending an alert to the user or to public policy server 112 that printing operations are to be stopped until the condition is met. Using the above example, the user may be asked to provide additional funds to his/her account to print the document.

If step 818 is yes, then step 822 executes by generating confirmation token 514 by public policy server 112. Confirmation token 514 indicates that the processing of binary data 140 at printing device 104 may proceed. Step 824 executes by sending confirmation token 514 to public file server 114 to obtain binary data 140, which is stored thereon. Public file server 114 may send binary data 140 to public policy server 112 upon receipt of confirmation token 514.

Step 826 executes by providing binary data 140 to printing device 104. Public policy server 112 may send binary data 140 once a connection is established with printing device 104. Public policy server 112 may have to wait until printing device 104 is available before forwarding binary data 140. Thus, the data from private job server 126 is not made available on printing device 104 until the operations are ready to commence. Although the current embodiments discuss printing on printing device 104, other operations also may occur, such as scanning, editing, faxing, and the like.

Figure 9:
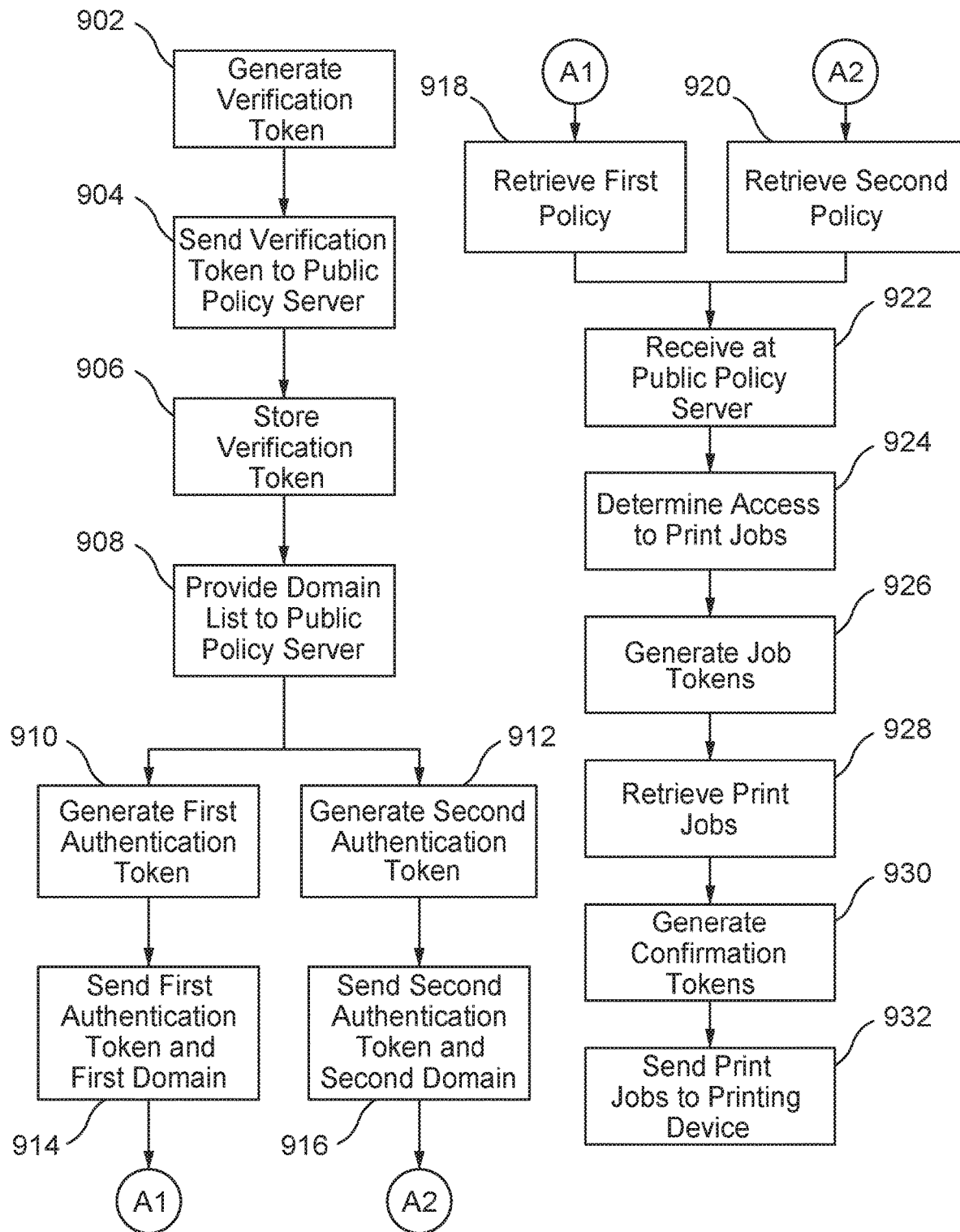
FIG. 9 illustrates a flowchart for selecting a plurality of print jobs from a plurality of private domains for printing in a public domain according to the disclosed embodiments.

FIG. 9 depicts a flowchart 900 for selecting a plurality of print jobs from a plurality of private domains 120 and 130 for printing in public domain 110 according to the disclosed embodiments. Flowchart 900 may refer back to elements disclosed in FIGS. 1-5 for illustrative purposes. The embodiments disclosed by flowchart 900, however, are not limited to the features disclosed in FIGS. 1-5. Further, flowchart 900 may compliment the embodiments disclosed by flow diagram 300.

As disclosed above, different policies apply to different to users and prints jobs from different private domains. One private domain may not allow color printing while another private domain may not allow unlimited printing. Thus, public policy server 112 configures itself to resolve the different requirements set forth in a plurality of policies from various private policy servers. Further, public policy server 112 may manage different job lists and print jobs from the plurality of private domains. Alternatively, a private domain may have different domains related to it, such as example1.com and example2.com for private domain 120 shown in FIG. 4A. Different policies may come from a single private policy server.

Step 902 executes by generating verification token 502 at private authentication server 124. Private authentication server 124 receives information about public policy server 112 in order to establish a protocol connection. Verification token 502 helps to establish a connection between private authentication server 124 and public policy server 112. Private authentication server 134 also may generate a verification token 502 to establish protocol connection to public policy server 112.

Step 904 executes by sending verification token 502 to public policy server 112. Step 906 executes by storing verification token 502 at public policy server 112. As long as public policy server 112 can present verification token 502 when requested or when submitting a print request for a user, the connection is established with private authentication server 124. Step 908 executes by providing domain list 146 from private authentication server 124 to public policy server 112. Domain list 146 may include information pertaining to a plurality of domains for a plurality of private domains, as disclosed by FIG. 4A.

Step 910 executes by generating a first authentication token 506. Step 912 executes by generating a second authentication token 506. The first authentication token may be generated in response to a first user providing user information at public policy server 112. The second authentication token may be generated in response to a second user providing user information at public policy server 112. Public policy server 112 may access the appropriate private authentication server to validate the user information for each user. In some embodiments, private authentication server 124 may validate both users and generate both authentication tokens. Alternatively, private authentication server 124 may generate the first authentication token while private authentication server 134 may generate the second authentication token. Public policy server 112 may have instructions when to use the different private authentication servers.

Step 914 executes by sending the first authentication token and a first domain to a first private policy server. Step 916 executes by sending the second authentication token and a second domain to a second policy server. Public policy server 112 determines which private domain is applicable to each user. The determination of the private domain may be based on the email address for each user. In some embodiments, public policy server 112 may send this data to a single private policy server, which stores different policies for different domains that use a single private domain. Alternatively, the authentication tokens and domains may be sent to separate private policy servers. For example, the first authentication token and first domain are sent to a first private policy server, such as private policy server 128. The second authentication token and the second domain are sent to a second private policy server, such as private policy server 138.

Flowchart 900 proceeds to steps A1 and A2 for steps 914 and 916, respectively. Steps A1 and A2 then proceed to steps 918 and 920, respectively. Step 918 executes by retrieving a first policy, such as policy 142, in response to the first authentication token and the first domain. Step 920 executes by retrieving a second policy, such as policy 142, in response to the second authentication token and the second domain. In some embodiments, the first policy is stored on private policy server 128 and the second policy is stored on private policy server 138. Alternatively, both policies may be stored on private policy server 128 or 138. The first policy may apply to the first user and the second policy may apply to the second user.

Step 922 executes by receiving the first and second policies at public policy server 112. Step 924 executes by determining access to a first print job according to the first policy and access to a second print job according to the second policy. Public policy server 112 may configure the parameters of each policy to determine what type of print jobs may be made available to each user. For example, the first print job may not be available to the second user according to the second policy. The determination of access may relate to what print jobs are available to the users over public domain 110.

Step 926 executes by generating first and second job tokens, such as job token 510, based on the first and second policies at public policy server 112. A first job token is generated for the first policy and a second job token for the second policy. In some embodiments, the first job token may be sent to private job server 126 and the second job token may be sent to private job server 136. The different private job servers are in separate private domains. Alternatively, the job tokens may be sent to private job server 126 or 136.

Step 928 executes by retrieving a first job list, such as job list 511, based on the first policy and the received first job token and retrieving the second job list, such as job list 511, based on the second policy and the received second job token. The applicable private job server or servers provide the job lists to public policy server 112. The first user may select a first print job from the first print job list. The second user may select a second print job from the second print job list. These requests are communicated back to the application private job server or servers. The binary data for the first and second print jobs are sent to public file server 114.

Step 930 executes by generating confirmation tokens, such as confirmation token 514, at public policy server 112 to indicate that the print jobs may be processed at printing device 104. Public policy server 112 may confirm that each user has enough funds in his/her account to perform operations on printing device 104, as disclosed above. A first confirmation token for the first print job is presented to public file server 114. A second confirmation token for the second print job is presented to public file server 114. Public file server 114 provides the binary data for each print job to public policy server 112. Step 932 executes by sending the binary data for the first and second print jobs to printing device 104.

In some embodiments, it may be desired to not provide the policy to the public domain, either in a public domain server or the printing device. The policy could include details that are sent to many components within the system. Some servers and devices may not be able to implement the policy effectively. A policy may be a complex concept. Whenever policy data arrive at the device, the data may need to be parsed correctly and applied correctly when a print job is sent to the device. These operations may impose a heavy burden on the development and maintenance of the device. Preferably, the printing system would like the printing device, for example, to focus on what it does, such as printing, scanning, or copying.

Figure 10:
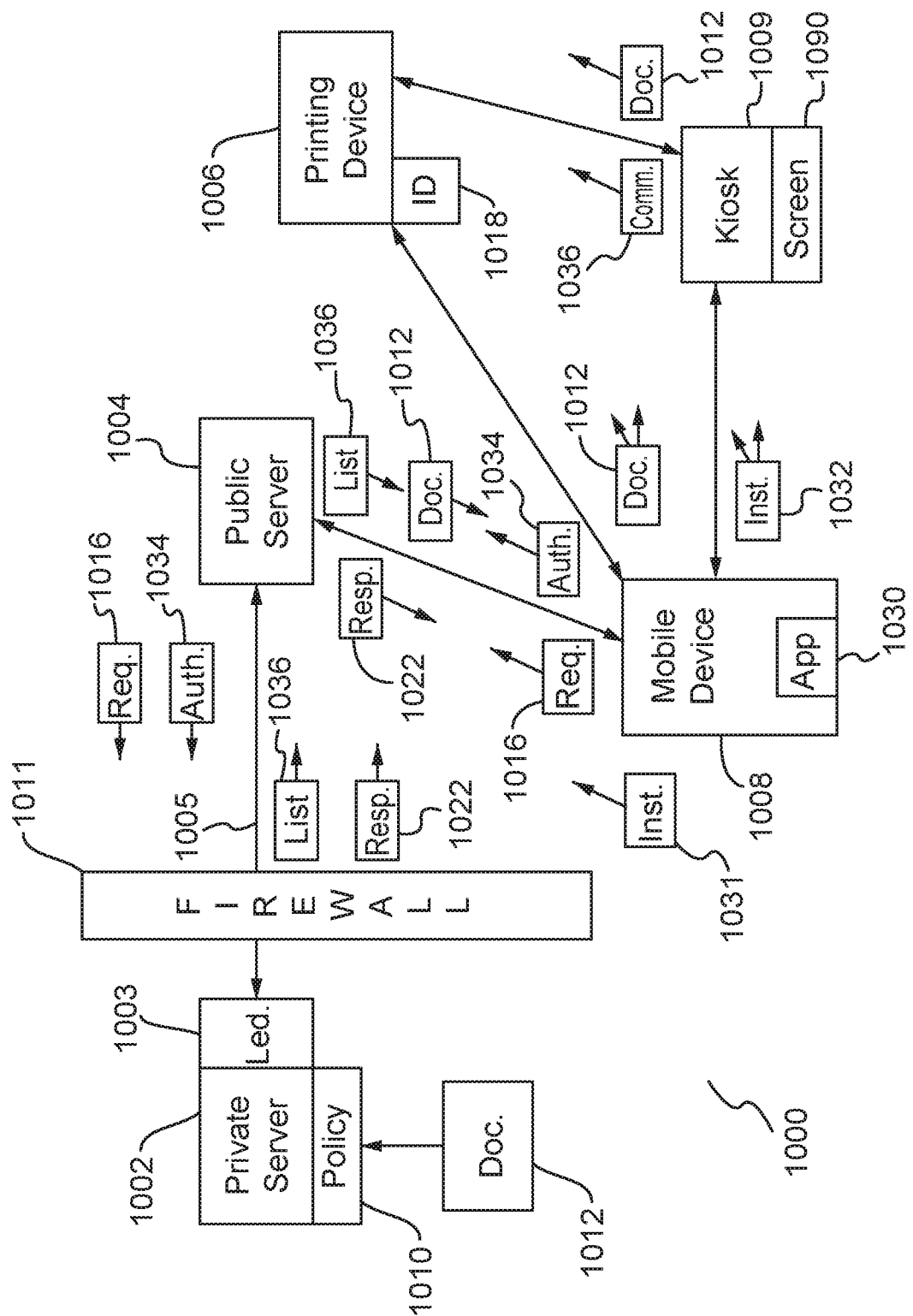
FIG. 10 illustrates a policy-based system to implement policy-based printing using a mobile device according to the disclosed embodiments.

FIG. 10 illustrates a policy-based system 1000 to implement policy-based printing using a private server 1002 according to the disclosed embodiments. System 1000 may reduce development and maintenance responsibilities in multiple components in the system and provide additional security with an advanced policy. In some embodiments, a private server at the corporate office, or private domain, has the policy set by an administrator. The policy changes frequently and becomes more complex with each evolution of software within the printing system or on the devices.

On the private server, a ledger may exist on the private server that records all the actions performed by all end user who are printing, copying, scanning, and the like within system 1000. The users may utilize printing devices and servers in a public domain such that they perform actions outside the normal corporate environment. A public server may serve as a gateway to the private domain. It may have open websocket bi-directional communication with the private server, as disclosed above. The printing device is connected to the public network and also is connected to the public server to whether it can do a simple action on behalf of the user in processing a document.

FIG. 10 shows a policy-based system 1000 having a private server 1002, a public server 1004, a printing device 1006, and a mobile device 1008. A kiosk 1009 also is shown, which may connect to printing device 1006. In system 1000, private server 1002 may refer to any of the servers in the private domain, such as private authentication server 124, private job server 126, and private policy server 128 of private domain 120 shown in FIG. 1. Private server 1002 may be used in system 1000 to mean any server or group of servers in a private domain, as disclosed above. Private server 1002 may be separated from servers and printing devices in public domains by firewall 1011. Private server 1002 also stores and applies policy 1010. Policy 1010 may correspond to policy 142 disclosed above.

Public server 1004 may refer to any of the servers in the public domain, such as public file server 114 and public policy server 112 of public domain 110 shown in FIG. 1. Public server 1004 may be accessible by a plurality of printing devices, including printing device 1006. In the public domain, public server 1004 may manage print jobs going to various printing devices. Public server 1004 also exchanges data and information with mobile device 1008. Public server 1004 may include a connection to private server 1002, which has been verified and authenticated according the processes disclosed above. For example, a websocket connection 1005 may exist between private server 1002 and public server 1004.

Printing device 1006 may receive documents from public server 1004 and mobile device 1008, as well as other sources, to print, copy, store, modify, and the like. The features of printing devices according to the disclosed embodiments are disclosed above. Printing device 1006 may include device identification 1018 that indicates a unique identifier within system 1000. In some embodiments, device identification 1018 may be a number, alphanumeric characters, or a combination thereof. Public server 1004 and mobile device 1008 may send documents and files to printing device 1006 based on device identification 1018.

In some embodiments, kiosk 1009 may be connected to printing device 1006. Kiosk 1009 may issue commands 1036 to printing device 1006 as well as documents to print. Kiosk 1009 may include a computer having a touch screen

1090 that receives input to generate command 1036. For example, a user may select an item shown on touch screen 1090 to print along with different effects or changes to the print job, such as only a certain number of pages and the like. Kiosk 1006 may receive instructions 1032 from mobile device 1008

Mobile device 1008 may be a mobile phone, laptop, tablet, and the like. Mobile device 1008 may move between the private domain and the public domain, as separated by firewall 1011. It also may access private server 1002 as well as public server 1004. A user may send and receive data from the servers at mobile device 1008. Mobile device 1008 also may send instructions 1031 to printing device 1006 to print, copy, scan, and the like stored documents from private server 1002. Mobile device 1008 also may send instructions 1031 to public server 1004 to perform an action, such as retrieving a stored document. Mobile device 1008 executes application 1030 that enable policy-based printing within system 1000. These features are disclosed in greater detail below by FIG. 11.

Private server 1002 may store document 1012. Document 1012 may be similar to the print jobs disclosed above. Document 1012 includes data and information that is transmitted to devices within the private domain. The user of mobile device 1008 may upload document 1012 within the private domain. Document 1012, however, may be processed and printed at devices outside the public domain and not necessarily at devices connected to private server 1002. Policy 1010 also may be used to determine how and if document 1012 is used within system 1000 outside the private domain.

The user may authenticate mobile device 1008 to public server 1004 according to the disclosed embodiments. For example, user device 1008 may provide authentication information 1034, such as a user/account name and password, to verify the user to public server 1004. This process may be disclosed above with regard to verification between public policy server 112 and private authentication server 124. Alternatively, authentication information 1034 may be an authentication token used by user device to authenticate the user in a public domain. Public server 1004 may use authentication information 1034 to authenticate mobile device 1008 to communicate with private server 1002. Private server 1002 verifies the authentication information. In some embodiments, private server 1002 may issue an authentication token stored on mobile device 1008, which is used as authentication information 1034 to verify the user.

In some embodiments, printing device 1006 receives instructions 1032 from user device 1008 to print document 1012. An electronic copy of document 1012 may be sent to printing device 1006 to process and print, copy, scan, and the like. The user also may modify the electronic copy. In summary, a document stored on private server 1002 is made available on a public device using mobile device 1008.

Before receiving document 1012, printing device 1006 in conjunction with public server 1004 and private server 1002 may determine whether any action on behalf of the user is allowed at the printing device. An action by printing device 1006 is a simple operation of print, copy, scan, and the like. It may be measured in the smallest scale possible, such as a single page at a time. Thus, mobile device 1008 may send request 1016 to public server 1004, which is then forwarded to private server 1002. Mobile application 1030 does not need to determine whether document 1012 can be printed at printing device 1006.

Public server 1004 receives request 1016 to access document 1012 for printing. Public server 1004 may forward request 1016 without further processing. In other embodiments, public server 1004 may break down request 1016 into smaller requests that permit the responses to be in a YES or NO format. Upon receipt of responses from private server 1002, public server 1004 may forward document 1012 or provide further instructions to mobile device 1008.

Private server 1002 receives request 1016 from public server 1004 via websocket connection 1005. If no websocket connection exists, then private server 1002 may not receive the request and public server 1004 responds to mobile device 1008 with an alert that printing, copying, scanning, and the like for request 1016 is denied. Upon receipt of request 1016, private server 1002 analyzes policy 1010 to determine whether the action is allowed for the user on printing device 1006. Private server 1002 also compiles or accesses ledger 1003 to determine if the action is allowed. Ledger 1003 may be a record or file of all distinct action within system 1000 that provides the status of the account for the user. For example, ledger 1003 may indicate how many pages that the user has printed in the policy-set period, costs incurred, and other statistics of actions limited by policy 1010.

Depending on the results of the determination, private server 1002 sends response 1022 to public server 1004. Response 1022 may include a copy of document 1012 for printing. "Document" in this sense includes the data file used to print a copy of document 1012 at printing device 1006. The data file includes the electronic data needed to reproduce and print the document. Response 1022 may include more than one response, but is shown as a single response for brevity. Public server 1004 may analyze the response to ensure it is appropriate. Public server 1004 forwards response 1022 to mobile device 1006, which acts accordingly. The response sent to mobile device 1008 also may include statistics or information regarding the status of the user's account based on ledger 1003 and policy 1010. Response 1022 also may act as a notification to mobile application 1030 that document 1012 is ready for printing, as the user may not have selected a printing device yet.

System 1000 shows mobile device 1008 sending instructions 1032 to printing device 1006 or kiosk 1009. In some embodiments, the user may interact directly with kiosk 1009 to process document 1012 thereon. Use of a kiosk is not required to print, copy, or scan a document at printing device 1006 using mobile device 1008.

In some embodiments, a print job list 1036 may be generated by private server 1002 and sent to mobile application 1030 on mobile device 1008 after the authentication information is verified. The user may view print job list 1036 on mobile device 1008 and select a print job from the list. For example, the user may view and input on a screen an instruction to print document 1012. Thus, request 1016 is created by mobile application 1030 and sent to private server 1002 through public server 1004.

As noted above, mobile device 1008 may receive a notification in response 1022 that document 1012 is available to print. Mobile device 1008 then may move to a network or connection to printing device 1006 in order to print. Once the connection is established between mobile device 1008 and printing device 1006, mobile application 1030 may send instructions 1031 to public server 1004 to retrieve document 1012 from private server 1002. Private server 1002 forwards document 1012 to public server 1004. Document 1012 is made available for download to mobile device 1008. In some embodiments, public server 1004 may provide an internet protocol (IP) address that allows mobile application 1030 to direct instructions 1031. For example, a browser may open with a link to download document 1012 to mobile device 1008.

Once document 1012 is downloaded to mobile device 1008, mobile application 1030 may be used to send the document to printing device 1006. Printing device 1006 then prints document 1012. Alternatively, mobile application 1030 may send document 1012 to kiosk 1009. For example, document 1012 may be tickets to an event. The user would like to print the tickets at printing device 1006. Kiosk 1009, however, allows the user to view the tickets and select them, such as using touch screen 1090. Kiosk 1009 then sends document 1012 along with command 1036 to printing device 1006. Further, modifications and changes may be made at kiosk 1009 by the user or upon receipt of instructions 1032 from mobile application 1030.

Figure 11:
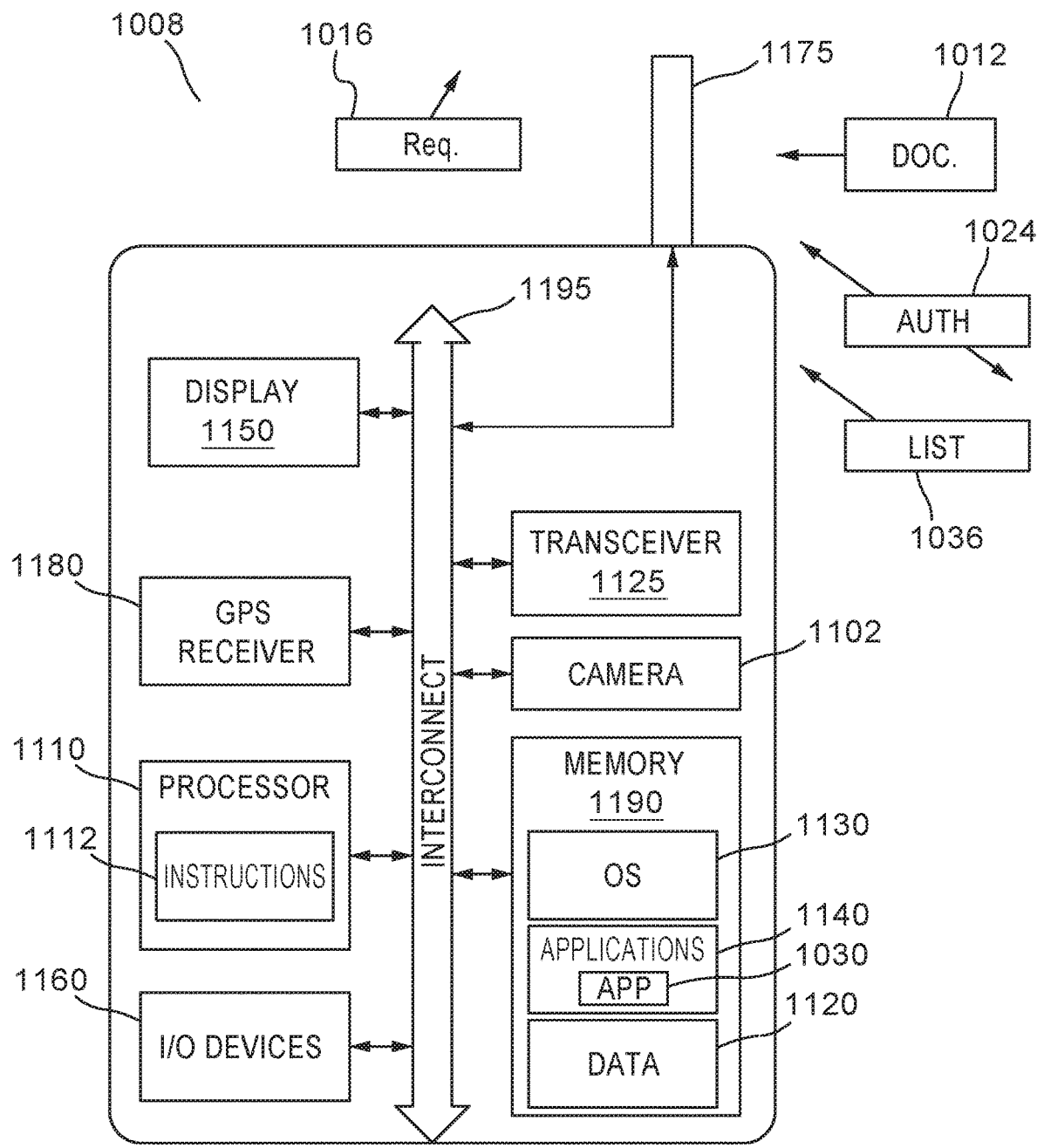
FIG. 11 illustrates a mobile device for use in a policy-based printing system according to the disclosed embodiments.

FIG. 11 illustrates a block diagram of a mobile device 1008 for use in a policy-based printing system 1000 according to the disclosed embodiments. Mobile device 1008 executes mobile application 1030 to enable policy-based printing operations within system 100. Mobile device 1008 may include a processor 1110. Processor 1110 may be any of a variety of different types of processors suitable for mobile devices. Processor 1110 executes instructions 1112. Instructions 1112 may be loaded into processor 1110 in order to configure mobile device 1008 to perform specified functions or operations. These instructions may come from applications 1140 stored in memory 1190, or may be partially or wholly hardwired as part of processor 1110.

Memory 1190, such as random access memory (RAM), a flash memory, or other type of memory, is accessible by processor 1110. In some embodiments, memory 1190 may be partially comprised of read-only memory (ROM). Memory 1190 may be configured to store an operating system (OS) 1130, data 1120, and applications 1140. Applications 1140 include client agents, mobile applications, and mobile location-enabled applications that may provide location-based services to the user. Data 1120 may include data received from the other entities in system 1000, such as private server 1002, public server 1004, printing device 1006 and kiosk 1009.

Processor 1110 may be coupled, either directly or via appropriate intermediary hardware, to a display 1150 and to one or more input/output (I/O) devices 1160, such as a keypad, a touch panel sensor, a microphone, and the like. Processor 1110 also may be coupled to transceiver 1125 that interfaces with an antenna 1175 to send and receive data within system 1000. Transceiver 1125 may be configured to transmit and receive cellular network signals, wireless data signals, or other types of signals via antenna 1175. Mobile device 1008 may be configured by an application 1140 to receive and transmit specific types of signals. Mobile device 1008 also may include a port or connection through I/O devices 1160 to communicate with a device connected by a wire or other physical connection. In some embodiments, a global positioning system (GPS) receiver 1180 also may make use of antenna 1175 to receive GPS signals.

Mobile device 1008 also includes camera 1102. Camera 1102 may capture images for use by applications 1140. Specifically, camera 1102 may act as a scanner to capture images, graphical codes, video, or other visual data. The captured data may be used in mobile application 1030. Mobile application 1030 may upload the captured data as document 1012 to private server 1002. The appropriate application within applications 1140 may control camera 1102.

Each of camera 1102, display 1150, transceiver 1125, GPS receiver 1180, processor 1110, memory 1190, I/O devices 1160, and antenna 1175 may be connected to interconnect 1195. Alternatively, the components of mobile device 1008 may be connected directly or indirectly to one or more of each other. Interconnect 1195 may be one or more mobile device communications systems such as a bus or other hardware to enable communication between the components of mobile device 1008.

Applications 1140 include mobile application 1030 to enable policy-based printing within system 1000. Mobile application 1030 on mobile device 1008 may be used to authenticate the user with private server 1002 and to select a print job to print at a printing device outside the private domain. The disclosed embodiments may allow the user to authenticate with private server 1002 with mobile application 1030. The user may not want to do authentication again so the disclosed embodiments allow printing operations to proceed without repeated authentication information submissions.

Policy-based printing with mobile application 1030 also may allow printing to occur on a printing device that does not work with private server 1002 or public server 1004. Mobile device 1008 may act as the "printing device" to these components within system 1000. Private server 1002 applies policy 1010 to a print job request and makes document 1012 available to mobile device 1008 using mobile application 1030. The document is sent to public server 1004. Mobile application 1030 downloads the document from public server 1004. Mobile application 1030 may send document 1012 to kiosk 1009 or printing device 1006 to print the document.

Mobile device 1008 may store authentication information 1034 as an authentication token in memory 1190. The authentication token may be issued by private server 1002 so that the user does not need to authenticate each time he/she wants to print a document. The authentication token informs private server 1002 that the user and mobile device 1008 are verified as legitimate users of system 1000. The authentication token may expire after a period of time, such as 24 hours, to prevent unauthorized access to private server 1002. Mobile application 1030 may submit the authentication token when a request 1016 is generated. Alternatively, the authentication token may be submitted to public server 1004, which then performs the authentication actions needed to verify the user with private server 1002. Public server 1004 may store authentication information 1034 and forwards the information to private server 1002 upon receipt of the authentication token.

Mobile application 1030 also may receive print job list 1036. Print job list 1036 is displayed on display 1150 so that the user can select the print job to be downloaded. Private server 1002 may generate print job list 1036 with the documents accessible by the user. Private server 1002 also may pre-emptively apply policy 1010 to the print jobs in print job list 1036 to indicate the ones that should be allowed by the policy. This feature may save time and resources in preventing the selection of print jobs that will not be allowed according to policy 1010.

According to the disclosed embodiments, when mobile application 1030 is launched on mobile device 1008, the mobile device become a special purpose device to enable policy-based printing operations. Processor 1110 is configured to perform the operations to obtain and receive a document to print from private server 1002. Mobile application 1030 controls the other components of mobile device 1008 to perform the operations disclosed in FIGS. 12 and 13 below. Mobile application 1030 may send and receive data and information to print documents using a policy-based system.

Figure 12:
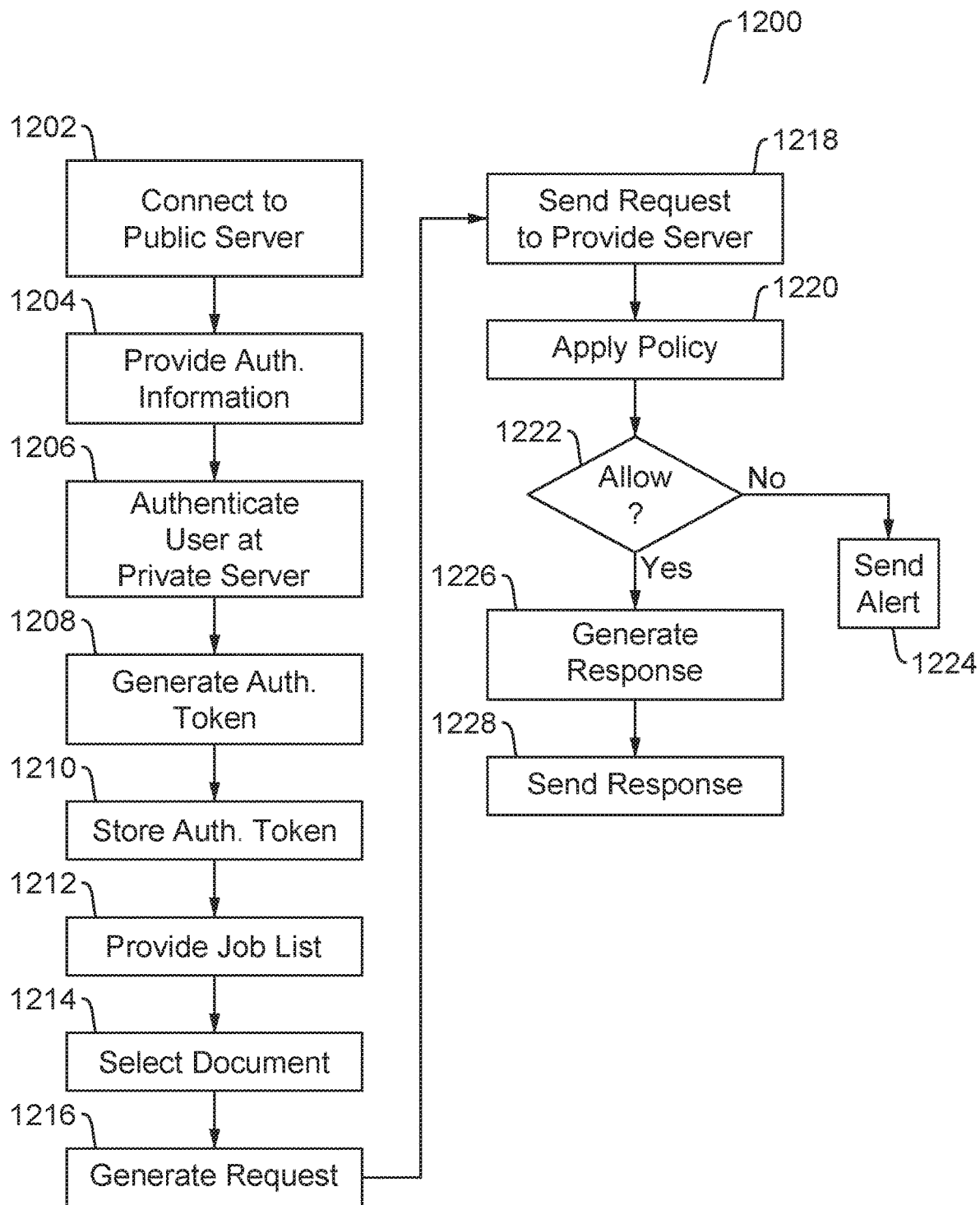
FIG. 12 illustrates a flowchart for using a policy-based system with a mobile device according to the disclosed embodiments.

FIG. 12 illustrates a flowchart 1200 for using a policy-based system 1000 with a mobile device 1008 according to the disclosed embodiments. Flowchart 1200 may refer to FIGS. 1-11 for illustrative purposes. The disclosed embodiments of flowchart 1200, however, are not limited by FIGS. 1-11.

Step 1202 executes by connecting mobile device 1008 to public server 1004. A wireless connection over a network, for example, may be used to connect mobile device 1008 to public server 1004. Alternatively, mobile device 1008 may connect to printing device 1006 or kiosk 1009, which directs the mobile device to connect with public server 1004. Step 1204 executes by providing authentication information 1034 from mobile device 1008 to public server 1004. Authentication information 1034 may include a user name and password for the user. The user may enter this information into mobile application 1030. Alternatively, authentication information 1034 may be an authentication token stored on mobile device 1008.

Step 1206 executes by authenticating the user at private server 1002 using authentication information 1034. Public server 1004 connects with private server 1002 using connection 1005. Private server 1002 recognizes that public server 1004 is valid and may receive information therefrom. Public server 1004 forwards the authentication information to private server 1002. Private server 1002 verifies that user may use system 1000, such as public server 1004, to print documents using mobile device 1008.

Step 1208 executes by generating an authentication token, if appropriate. The use of an authentication token as authentication information 1034 is disclosed above. If no token is issued, then private server 1002 may generate one here. The authentication token may resemble the tokens disclosed above. Private server 1002 may send the authentication token to mobile device 1008 through public server 1004. Public server 1004 may associated the authentication token to the user in the event the public server sends authentication information 1034 to private server 1002 when it receives the token from mobile device 1008. Private server 1002 or public server 1004 also may place a limit of use for the authentication token in that it expires after so many uses or a period of time. If received after expiration, then public server 1004 may notify mobile application 1030 to resubmit authentication information 1030. Step 1210 executes by storing the authentication token on mobile device 1008.

Step 1212 executes by providing print job list 1036 from private server 1002 to mobile device 1008 through public server 1004. Print job list 1036 is provided to mobile application 1030. It may display the list of print jobs in display 1150 of mobile device 1008. Private server 1002 generates print job list 1036 based on documents available to the user based on authentication information 1034. This step may be optional in that no print job list is provided.

Step 1214 executes by selecting document 1012 to be printed using mobile application 1030. Document 1012 is stored on private server 1002 and not readily available for printing. The printing operations are to be approved according to policy 1010. Step 1216 executes by generating request 1016 for document 1012. Mobile application 1030 may generate the request and forward it to public server 1004.

Step 1218 executes by sending request 1016 to private server 1002 from public server 1004. Again, mobile device 1008 does not send the request directly to private server 1002. Use of public server 1004 allows private server 1002 to exchange information with one source as opposed to many different devices. Public server 1004 also may queue requests appropriately. Request 1016 indicates that the user of mobile device 1008 would like to print document 1012.

Step 1220 executes by applying policy 1010 to the request. Private server 1002 applies policy 1010 to determine whether the print job should be allowed. These operations are disclosed in greater detail above. Ledger 1003 may be used to determine statistics for the print job and whether printing the document will violate policy 1010. For example, ledger 1003 may indicate the number of pages printed by the user in a printing period, such as a week. The disclosed embodiments compile this information to see if printing document 1012 will exceed the page limits set forth by the parameters of policy 1010.

Step 1222 executes by determining whether the print job of request 1016 is allowed according to policy 1010. If no, then step 1224 executes by sending an alert to mobile device 1008. The alert may be received by mobile application 1030 and relayed to the user. Private server 1002 also may alert public server 1004 that the request to print the document was denied. Printing device 1006 may not be alerted or made aware of the denial.

If step 1222 is yes, then step 1226 executes by generating response 1022 at private server 1002. In some embodiments, response 1022 may include data to print document 1012. As noted above, use of the term "document" includes the data needed to print the document at a printing device or stored on mobile device 1008, public server 1004, or kiosk 1008. Alternatively, response 1022 may be a notification to mobile application 1030 that document 1012 is available for download. Step 1228 executes by sending response 1022 from private server 1002 to mobile device 1008 through public server 1004. Mobile application 1030 may receive response 1022 and alert the user that the document is ready for printing.

Figure 13:
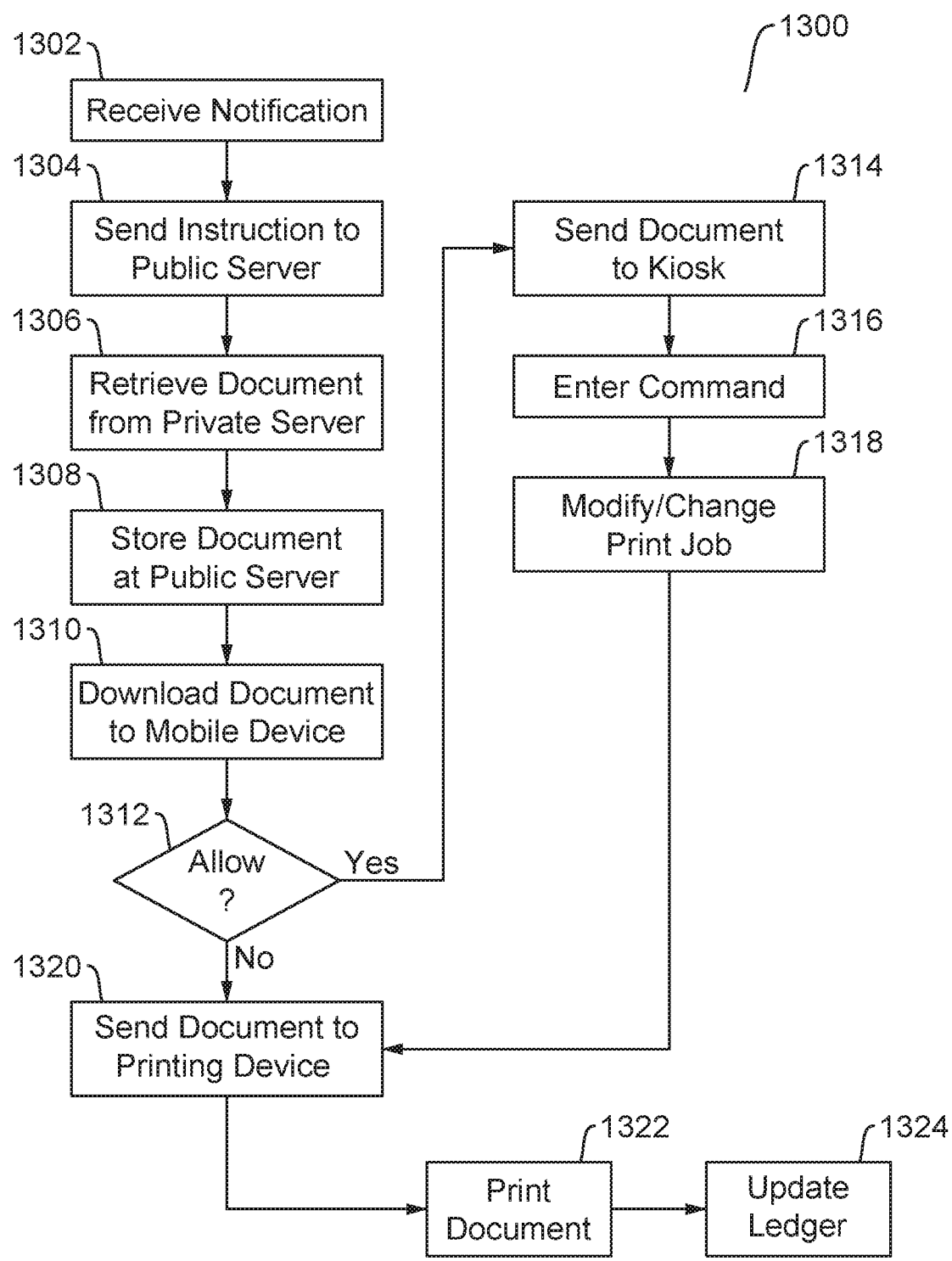
FIG. 13 depicts a flowchart for printing a document using mobile device according to the disclosed embodiments.

FIG. 13 depicts a flowchart 1300 for printing a document 1012 using mobile device 1008 according to the disclosed embodiments. Flowchart 1300 may refer to FIGS. 1-12 for illustrative purposes. The disclosed embodiments of flowchart 1300, however, are not limited by FIGS. 1-12.

Step 1302 executes by receiving a notification, such as response 1022, at mobile application 1030 that document 1012 is available to print. Private server 1002 may notify public server 1004, which, in turn, sends a notification to mobile device 1008. Alternatively, document 1012 may be sent to public server 1004 and stored thereon. This feature may push the retrieval downstream. Step 1304 executes by mobile application 1030 sending instructions 1031 to retrieve document 1012 for printing. Instructions 1031 may be sent to public server 1004.

Step 1306 executes by retrieving document 1012 from private server 1002 as requested by mobile application 1030. As document 1012 is already approved for printing, policy 1010 does not need to be applied again. Step 1308 executes by storing document 1012 at public server 1004. In some embodiments, public server 1004 may then send the notification to mobile application 1030 that document 1012 is available. Step 1310 executes by downloading document 1012 to mobile device 1008. Document 1012 is stored on mobile device 1008. Mobile application 1030 may be updated to indicate that document 1012 is ready to print.

In some embodiments, the steps disclosed above may be modified in that document 1012 is sent to public server 1004 or mobile device 1008 as soon as policy 1010 allows it. A notification is not sent and instructions are not needed to retrieve document 1012. In other embodiments, public server 1004 retrieves document 1012 as soon as response 1022 is received or response 1022 includes document 1012. Mobile device 1008 receives document 1012 with response 1022.

Step 1312 executes by determining whether the user of mobile device 1008 would like to send document 1012 to kiosk 1009. Some printing devices may include or be connected to a kiosk, or printing terminal, that acts as a computer to manage print jobs on the printing device or devices. The user may view the print job before printing and make changes or select portions of the document to print. If step 1312 is yes, then step 1314 executes by sending document 1012 from mobile device 1008 to kiosk 1009. Mobile application 1030 may include an IP address for kiosk 1009. Preferably, document 1012 is sent over a wireless network to kiosk 1009 for security reasons. For example, kiosk 1009 may verify mobile device 1008 and mobile application 1030 to use its features and that an account is available to which charge print jobs.

At kiosk 1009, document 1012 may be displayed. Several print jobs may be displayed and the user selects document 1012 for printing. Step 1316 executes by entering a command at kiosk 1009. The command may be to print document 1012 as shown or step 1318 may be executed to modify or change the print job. For example, if document 1012 includes 20 pages, then the user may use kiosk 1009 to select 10 pages for printing. Further, the user may use kiosk 1009 to verify that document 1012 is correct before printing in order to avoid unnecessary fees. Flowchart 1300 proceeds to step 1320.

If step 1312 is no, then step 1320 executes by sending document 1012 to printing device 1006. Further, after command 1036 is entered in kiosk 1009, then document 1012 may be sent to printing device 1006 along with the command In any event, document 1012 is received at printing device 1006. Step 1322 executes by printing document 1012 as directed by mobile application 1030 or kiosk 1009. Step 1324 executes by updating ledger 1003 with the results of the print job, such as the number of pages printed or total costs for the print job. Further, mobile application 1030 may be updated that the printing of document 1012 is complete. In some embodiments, document 1012 may be deleted from mobile device 1008.

Thus, policy-based printing may occur without a direct connection between the printing device and the private server or public server within the system. A mobile application on a mobile device may act as a device in terms of requesting the document and applying the policy to the printing of the document. The user of the mobile device may invoke the policy to be applied and not the printing device. Further, application of the policy occurs at the private server and not in the public domain or the mobile device.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more multi-functional printer (MFP) systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A policy-based printing method comprising:
   authenticating a user of a mobile application on a mobile device to send a request to a private server in a private domain using a public server in a public domain, wherein the mobile device is connected to the public server in the public domain;
   selecting a document stored on the private server using the mobile application;
   sending the request to print the document from the mobile application to the private server using the public server;
   applying a policy by the private server to determine whether the request is acceptable, wherein the policy corresponds to a user of the mobile device, wherein the policy is stored at the private server;
   retrieving the document from the private server in the private domain to the public server in the public domain if the request is acceptable;
   downloading the document to a mobile device from the public server in the public domain, wherein the mobile application executes on the mobile device;
   sending the document to a printing device within the public domain from the mobile device; and
   printing the document at the printing device.

2. The policy-based printing method of claim 1, further comprising connecting to the printing device from the mobile device after downloading the document.

3. The policy-based printing method of claim 1, wherein the sending the document includes sending the document to a kiosk connected to the printing device.

4. The policy-based printing method of claim 3, further comprising indicating that the document is to be printed using the kiosk and sending the document to the kiosk from the mobile device.

5. The policy-based printing method of claim 4, further comprising sending the document from the kiosk to the printing device.

6. The policy-based printing method of claim 1, wherein the authenticating includes storing an authentication token at the mobile device.

7. The policy-based printing method of claim 6, further comprising providing the authentication token to the private server to authenticate the user.

8. The policy-based printing method of claim 1, wherein the selecting includes selecting the document from a list of documents stored on the private server using the mobile application.

* * * * *